(12) United States Patent
Sakamoto

(10) Patent No.: US 8,180,054 B2
(45) Date of Patent: May 15, 2012

(54) AUTHENTICATING SYSTEM, AUTHENTICATING METHOD, AND AUTHENTICATING PROGRAM

(75) Inventor: Yu Sakamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 1095 days.

(21) Appl. No.: 12/015,630

(22) Filed: Jan. 17, 2008

(65) Prior Publication Data

US 2008/0181403 A1    Jul. 31, 2008

(30) Foreign Application Priority Data

Jan. 25, 2007  (JP) ................................. 2007-014897

(51) Int. Cl.
    *G06F 21/00*    (2006.01)
(52) U.S. Cl. .............................. 380/258; 713/150; 726/2
(58) Field of Classification Search ........................ None
    See application file for complete search history.

(56) References Cited

U.S. PATENT DOCUMENTS

| | | | | |
|---|---|---|---|---|
| 6,834,112 B1 * | 12/2004 | Brickell | ........................ | 380/279 |
| 2003/0056096 A1 * | 3/2003 | Albert et al. | .................. | 713/168 |
| 2003/0204851 A1 * | 10/2003 | Powell et al. | ................... | 725/63 |
| 2004/0093525 A1 * | 5/2004 | Larnen | .......................... | 713/201 |
| 2005/0147250 A1 * | 7/2005 | Tang | .............................. | 380/259 |
| 2005/0198490 A1 * | 9/2005 | Jaganathan et al. | .......... | 713/151 |
| 2005/0257246 A1 * | 11/2005 | Adams et al. | ..................... | 726/1 |
| 2007/0251997 A1 * | 11/2007 | Brown et al. | ................. | 235/380 |

FOREIGN PATENT DOCUMENTS

| | | |
|---|---|---|
| JP | 2000057099 A | 2/2000 |
| JP | 2004310202 A | 11/2004 |
| JP | 2005094146 A | 4/2005 |
| JP | 2005520423 A | 7/2005 |

OTHER PUBLICATIONS

TRA "Understanding IP Network Security", 2005.*

* cited by examiner

*Primary Examiner* — Michael Simitoski
*Assistant Examiner* — Brian Olion

(57) ABSTRACT

An authenticating system is provided including a client and a receiver. The client creates a first hash value using a first hash algorithm, and creates a second hash value from the first hash value. The receiver receives a first hash algorithm identifier from a server, transmits the second hash value, and receives an authentication result. The server stores a third hash value created using a second hash algorithm identifier, transmits the first hash algorithm identifier to a PC, receives the second hash value, determines if the second hash algorithm identifier coincides with the first hash algorithm identifier, creates a fourth hash value from the third hash value using the first hash algorithm where it coincides, determines whether the second hash value coincides with the fourth hash value, transmits that the authentication is successful where it coincides, and transmits that the authentication is unsuccessful where it does not coincide.

6 Claims, 10 Drawing Sheets

HASH ALGORITHM LIST 14

HASH ALGORITHM INTENSITY TABLE 23

| HASH ALGORITHM IDENTIFIER | INTENSITY |
|---|---|
| md4 | 1 |
| md5 | 1 |
| sha1 | 2 |
| sha256 | 3 |

FIG. 4

USER INFORMATION MANAGEMENT TABLE 24

| uid | uid_passwd_uHashV | uHash_alg_id |
|---|---|---|
| U000001 | bc373d17c5dbb116db4d7924e9ec601f05461c33 | sha1 |
| U000002 | 2f7abb3ee7a652382bde496e2bcd5305 | md5 |
| U000003 | b2c8fac8e42ea5864b267645c0f67d84cee645941a2bd33087707911d4da3c76 | sha256 |

| VARIABLE | EXPLANATION |
|---|---|
| rand1 (RANDOM NUMBER) | RANDOM NUMBER CREATED BY RANDOM NUMBER CREATOR (25) |
| sHash_alg_id (HIGHEST-INTENSITY HASH ALGORITHM IDENTIFIER) | HASH ALGORITHM IDENTIFIER HAVING HIGHEST INTENSITY OUT OF HASH ALGORITHMS THAT CAN BE UDED BY BOTH OF AUTHENTICATION CLIENT APPARATUS 10 AND AUTHENTICATION SERVER APPARATUS 20 |
| uid (USER ID) | USER ID INPUT BY USER |
| passwd (PASSWORD) | PASSWORD INPUT BY USER |
| uid_passwd_sHashV (FIRST HASH VALUE) | HASH VALUE CREATED FROM uid AND passwd BY USING HASH ALGORITHM THAT sHash_alg_id INDICATES |
| uid_passwd_sHashV_rand1_sHashV (SECOND HASH VALUE) | HASH VALUE CREATED FROM uid_passwd_sHashV AND rand1 BY USING HASH ALGORITHM THAT sHash_alg_id INDICATES |
| uHash_alg_id (USER ID CORRESPONDENCE HASH ALGORITHM IDENTIFIER) | HASH ALGORITHM IDENTIFIER RETAINED IN USER INFORMATION THAT CORRESPONDS TO uid RETAINED IN USER INFORMATION MANAGEMENT TABLE (24) |
| uid_passwd_uHashV (THIRD HASH VALUE) | HASH VALUE CREATED FROM uid AND passwd BY USING HASH ALGORITHM THAT uHash_alg_id INDICATES |
| uid_passwd_uHashV_rand1_sHashV (FOURTH HASH VALUE) | HASH VALUE CREATED FROM uid_passwd_uHashV AND rand1 BY USING HASH ALGORITHM THAT sHash_alg_id INDICATES |
| Npasswd (NEW PASSWORD) | NEW PASSWORD INPUT BY USER |
| uid_Npasswd_sHashV (FIFTH HASH VALUE) | HASH VALUE CREATED FROM uid AND Npasswd BY USING HASH ALGORITHM THAT sHash_alg_id INDICATES |

AUTHENTICATING SYSTEM, AUTHENTICATING METHOD, AND AUTHENTICATING PROGRAM

INCORPORATION BY REFERENCE

This application is based upon and claims the benefit of priority from Japanese patent application No. 2007-014897, filed on Jan. 25, 2007, the disclosure of which is incorporated herein in its entirety by reference.

RELATED ART

The present invention relates to an authenticating system, an authenticating method, and an authenticating program that can be successively utilized also in a case where a hash algorithm that is used in the authenticating system has been changed.

In recent years, transmission/reception of business secrecy, personal information, or the like has been widely performed between information processing units via a communication line such as Internet, and thus, ensuring a security of communication has become extremely important.

So as to ensure such a security of communication, conventionally, various technologies have been proposed, and the technologies that are widely utilized as a technology relating to a user authentication include a technology using the hash algorithm, which is employed for the authenticating system.

The so-called hash algorithm is an algorithm for creating another data into which an entirety of certain data has been reflected as a hash value. If original data slightly differs, then, the hash value that is created differs, and further, the hash value cannot be converted into the original data. For this reason, the hash algorithm can be utilized preferredly for the authenticating system because even if the hash value becomes known at the worst, no possibility that the original data leaks out exists.

As the related art associated with the authenticating system employing such a hash algorithm, the following can be listed.

At first, Patent document 1 discloses the authenticating apparatus for, with a created random number taken as challenge data, creating the hash value from a user ID and a password that were input, and challenge data, and utilizing it for authentication.

Further, Patent document 2 discloses the individual authenticating system for computing a hash value on the basis of user's biological information and a key value, which is pre-registered into a sever, inputting his/her biological data and the key value, computing a hash value from the biological information and the key value that were input, comparing the registered hash value with the computed hash value, and authenticating that the user is a person in question if it equals.

Further, Patent document 3 discloses the time authenticating system for computing a hash value by employing the hash algorithm having a user's terminal designated, comparing a hash value re-computed by employing the hash algorithm having an authenticating apparatus designated with a hash value acquired from the user's terminal, and verifying validity.

These authenticating systems of the related arts, however, cause the problem that when the hash algorithm in use is changed, the user has to input the authentication information once again to re-create the hash value of the authentication information because the hash value of authentication information recorded in the authentication server apparatus side cannot be inverse-transformed, and hence, the authenticating system cannot be successively used as it stands.

Further, the related arts cause the problem that the authentication information of all users has to be re-created collectively, which demands a lot of times, and the authentication system cannot be utilized during that time because, in such a case, the hash algorithm in use cannot be changed user by user.

Further, changing the hash algorithm in the authentication server apparatus side necessitates changing the hash algorithm as well of the authentication client apparatus side that corresponds hereto simultaneously.

Herein, with regard to a method of changing the hash algorithm in the authenticating process, for example, the method of updating the authentication algorithm in a computer system described in Patent document 4, or the like has been proposed.

This technique of updating the algorithm assumes a configuration in which a first account relating to a first authentication algorithm and a second account relating to a second authentication algorithm are filed in a memory device, the account is switched when a command for switching the account is executed, and the authentication algorithm as well is switched in synchronization hereto.

[Patent document 1] JP-P2000-057099A
[Patent document 2] JP-P2004-310202A
[Patent document 3] JP-P2005-094146A
[Patent document 4] JP-P2005-520423A However, the related arts cause the problem that even though this updating method is employed, the authentication information has to be input once again to re-create the hash value for authentication by employing a new hash algorithm for switching at the time of changing the hash algorithm in a case of applying this updating method for the authenticating system using the hash algorithm as an authentication algorithm because the hash value cannot be inverse-transformed into original data.

SUMMARY OF THE INVENTION

The present invention has been accomplished in consideration of the above-mentioned circumstances, and an exemplary object thereof is to provide an authenticating system that can be successively utilized also in a case where the hash algorithm, which is used in the authenticating system, has been changed by transmitting/receiving a hash algorithm identifier between an authentication client apparatus and an authentication server apparatus in the authenticating system, an authenticating method thereof, and an authenticating program thereof.

So as to accomplish the above-mentioned objects, the authenticating system of the present invention is an authenticating system for, with a client apparatus and a server apparatus connected via a communication line, executing an authentication of a user of the client apparatus by employing a hash algorithm, is configured so that: the client apparatus includes: an authenticating information inputter for inputting authentication information including identification information and a password of the user; a client-side hash value creator for creating a first hash value from the authentication information by employing a first hash algorithm that corresponds to a first hash algorithm identifier transmitted from the server apparatus, and creating a second hash value from the first hash value and a random number transmitted from the server apparatus by employing the first hash algorithm; and an authentication request manager for transmitting authentication request information for causing the server apparatus to start an authenticating process to the server apparatus, receiving the random number and the first hash algorithm identifier from the server apparatus, transmitting the identification information of the user input from the authentication information inputter and the second hash value to the server apparatus, and receiving an authentication result from the server apparatus; and the server apparatus includes: a user information storage in which user information has been stored that includes a second hash algorithm identifier that respectively corresponds for each the identification information of the user, and a third hash value pre-created from the authentication information including the identification information and the password of the user by employing a second hash algorithm that corresponds to this hash algorithm identifier; a random number creator for creating a random number; a server-side hash value creator for creating a hash value; and an authentication information manager for, upon receipt of the authentication request information from the client apparatus, causing the random number creator to create a random number, and transmitting the random number and the first hash algorithm identifier to the client apparatus, and for, upon receipt of the identification information of the user and the second hash value from the client apparatus, acquiring user information, which corresponds to this received identification information of the user, from the user information storage, determining whether or not the second hash algorithm identifier, which is included in the acquired user information, coincides with the first hash algorithm identifier, causing the server-side hash value creator to create a fourth hash value from a third hash value, which is included in the acquired user information, and the random number by employing the first hash algorithm in a case where it coincides, determining whether or not the second hash value coincides with the fourth hash value, transmitting the authentication result indicating that the authentication is successful to the client apparatus in a case where it coincides, and transmitting the authentication result indicating that the authentication is unsuccessful to the client apparatus in a case where it does not coincide.

Configuring the authenticating system in such a manner makes it possible to cause the server apparatus to pre-store the hash value and the identifier of the hash algorithm employed for computing its hash value for each user ID of the user of the client apparatus as user information and to transmit a predetermined hash algorithm identifier responding to the authentication request by the client apparatus, and at the time of having received the hash value and the user ID from the client apparatus, to determine whether or not the identifier of the hash algorithm that corresponds to the above user ID coincides with the hash algorithm identifier transmitted to the client apparatus.

And, in a case where it has been determined that it coincides, comparing the hash value calculated in the server apparatus with the hash value calculated in the client apparatus makes it possible to determine success or failure of the authentication.

In such a manner, the authenticating system of the present invention assumes a configuration of determining whether or not the hash algorithm employed for calculating the hash value in the client apparatus is identical to the hash algorithm in the server apparatus user by user, in which if it is identical, the authenticating process can be performed by comparing the hash value.

For this, in a case of changing the hash algorithm that is employed for the authenticating process in the authenticating system, it becomes possible to update the user information user by user at a timing at which the authenticating process is performed without a necessity for re-preparing all items of user information in the server apparatus at a stroke at a timing at which the hash algorithm is changed. Further, even though the hash algorithm in the server apparatus side is changed, it also becomes possible to gradually change the hash algorithms in the client apparatus side client apparatus by client apparatus without a necessity for changing all corresponding hash algorithms in the client apparatus at a stroke.

Further, the authenticating system of the present invention is configured so that: the authentication information manager in the server apparatus transmits the second hash algorithm identifier to the client apparatus as hash algorithm change request information in a case of having determined that the second hash algorithm identifier does not coincides with the first hash algorithm identifier; the authentication request manager in the client apparatus, upon receipt of the second hash algorithm identifier, causes the authentication information inputter to re-input the identification information, a password, and a new password of the user, causes the client-side hash value creator to create a new third hash value from the identification information and the password of the user, which were re-input, by employing the second hash algorithm, to create a new fourth hash value from the new third hash value and the random number by employing the first hash algorithm, and further to create a fifth hash value from the identification information and the new password of the user, which were re-input, by employing the first hash algorithm, and transmits the identification information of the user, the new fourth hash value, and the fifth hash value to the server apparatus; and the authentication information manager in the server apparatus, upon receipt of the identification information of the user, the new fourth hash value, and the fifth hash value, causes the server-side hash value creator to create a fourth hash value from the third hash value, which is included in the acquired user information, and the random number by employing the first hash algorithm, determines whether or not the fourth hash value coincides with the new fourth hash value, updates the second hash algorithm identifier and the third hash value that correspond to the identification information of the user in the user information storage into the first hash algorithm identifier and the fifth hash value, respectively, to transmit the authentication result indicating that the authentication is successful to the client apparatus in a case where it coincides, and transmits the authentication result indicating that the authentication is unsuccessful to the client apparatus in a case where it does not coincide.

Configuring the authenticating system in such a manner makes it possible to update the hash algorithm that is used for calculating the hash value user by user in a case where the hash algorithm employed for calculating the hash value in the client apparatus is not identical to the hash algorithm in the server apparatus.

That is, the user information in the server apparatus does not need to be newly prepared at a timing at which the hash algorithm is changed, and the user information can be updated individually at a timing at which the authenticating of each user is executed.

For this, the authenticating system of the present invention makes it possible to avoid stopping utilization of the authenticating system for a purpose of preparing the user information even though the necessity for changing the hash algorithm in use arises.

Further, the authenticating system of the present invention is configured so that: the client apparatus includes a hash algorithm identifier storage in which a list of hash algorithm identifiers has been stored that are usable in the above client apparatus; the server apparatus includes a hash algorithm intensity storage in which an intensity of the hash algorithm has been stored that corresponds for each identifier of the hash algorithm: the authentication request manager in the client apparatus, at the time of transmitting the authentication request information to the server apparatus, transmits the list of the hash algorithm identifiers to the server apparatus; and the authentication information manager in the server apparatus, upon receipt of the authentication request information and the list of the hash algorithm identifiers from the client apparatus, selects an identifier of the hash algorithm having a highest intensity from among the list of the hash algorithm identifiers based upon the intensity of each hash algorithm stored in the hash algorithm intensity storage, and transmits this selected identifier as the first hash algorithm identifier together with the random number to the client apparatus.

Configuring the authenticating system in such a manner makes it possible to automatically update the hash algorithm that is used in the authenticating system user by user into the hash algorithm having a highest intensity that can be used in the client apparatus and the server apparatus.

For this reason, when the necessity for changing the hash algorithm that is used in the system into the hash algorithm having a higher intensity arises due to detection etc. of fragility of the hash algorithm, or the like, the changing of the hash algorithm can be easily reflected into the authenticating system.

Further, the authenticating method of the present invention is an authenticating method of, with a client apparatus and a server apparatus connected via a communication line, executing an authentication of a user of the client apparatus by employing a hash algorithm, in which: an authentication request manager in the client apparatus transmits authentication request information for causing the server apparatus to start an authenticating process to the server apparatus; an authentication information manager in the server apparatus, upon receipt of the authentication request information from the client apparatus, causes a random number creator in the server apparatus to create a random number, and transmits the random number and a predetermined first hash algorithm identifier to the client apparatus; the authentication request manager in the client apparatus receives the random number and the first hash algorithm identifier from the server apparatus; an authentication information inputter in the client apparatus inputs authentication information including identification information and a password of the user; a client-side hash value creator in the client apparatus creates a first hash value from the authentication information by employing a first hash algorithm that corresponds to the first hash algorithm identifier, and creates a second hash value from the first hash value and the random number by employing the first hash algorithm; the authentication request manager in the client apparatus transmits the identification information of the user and the second hash value to the server apparatus; the authentication information manager in the server apparatus, upon receipt of the identification information of the user and the second hash value from the client apparatus, acquires user information that corresponds to this received identification information of the user from a user information storage in which user information has been pre-stored that includes a second hash algorithm identifier that respectively corresponds for each said identification information of the user, and a third hash value pre-created from the authentication information including the identification information and the password of the user by employing a second hash algorithm that corresponds to this hash algorithm identifier, determines whether or not the second hash algorithm identifier, which is included in the acquired user information, coincides with the first hash algorithm identifier, causes a server-side hash value creator in the server apparatus to create a fourth hash value from a third hash value, which is included in the acquired user information, and the random number by employing the first hash algorithm in a case where it coincides, determines whether or not the second hash value coincides with the fourth hash value, transmits the authentication result indicating that the authentication is successful to the client apparatus in a case where it coincides, and transmits the authentication result indicating that the authentication is unsuccessful to the client apparatus in a case where it does not coincide; and the authentication request manager in the client apparatus receives the authentication result from the server apparatus.

Further, the authenticating method of the present invention is a method, in which: the authentication information manager in the server apparatus transmits the second hash algorithm identifier to the client apparatus as hash algorithm change request information in a case of having determined that the second hash algorithm identifier does not coincide with the first hash algorithm identifier; the authentication request manager in the client apparatus, upon receipt of the second hash algorithm identifier, causes the authentication information inputter in the client apparatus to re-input the identification information, a password, and a new password of the user, causes the client-side hash value creator in the client apparatus to create a new third hash value from the identification information and the password of the user, which were re-input, by employing the second hash algorithm, to create a new fourth hash value from the new third hash value and the random number by employing the first hash algorithm, and further to create a fifth hash value from the identification information and the new password of the user, which were re-input, by employing the first hash algorithm, and transmits the identification information of the user, the new fourth hash value, and the fifth hash value to the server apparatus; and the authentication information manager in the server apparatus, upon receipt of the identification information of the user, the new fourth hash value, and the fifth hash value, causes the server-side hash value creator in the server apparatus to create a fourth hash value from the third hash value, which is included in the acquired user information, and the random number by employing the first hash algorithm, determines whether or not the fourth hash value coincides with the new fourth hash value, updates the second hash algorithm identifier and the third hash value that correspond to the identification information of the user in the user information storage into the first hash algorithm identifier and the fifth hash value, respectively, to transmit the authentication result indicating that the authentication is successful to the client apparatus in a case where it coincides, and transmits the authentication result indicating that the authentication is unsuccessful to the client apparatus in a case where it does not coincide.

Further, the authenticating method of the present invention is a method, in which: the client apparatus includes a hash algorithm identifier storage in which a list of hash algorithm identifiers has been stored that are usable in the above client apparatus; the server apparatus includes a hash algorithm intensity storage in which an intensity of the hash algorithm has been stored that corresponds for each identifier of the hash algorithm: the authentication request manager in the client apparatus, at the time of transmitting the authentication request information to the server apparatus, transmits the list of the hash algorithm identifiers to the server apparatus; and the authentication information manager in the server apparatus, upon receipt of the authentication request information and the list of the hash algorithm identifiers from the client apparatus, selects an identifier of the hash algorithm having a highest intensity from among the list of the hash algorithm identifiers based upon the intensity of each hash algorithm stored in the hash algorithm intensity storage, and transmits this selected identifier as the first hash algorithm identifier together with the random number to the client apparatus.

Configuring the authenticating method in such a manner makes it possible to change the hash algorithms in the server side in the first place, and to gradually change the hash algorithms in the client apparatus side client apparatus by client apparatus in a case of changing the hash algorithm that is used in the authenticating system to the hash algorithm having a higher intensity, or the like.

Further, the user information in the server apparatus does not need to be pre-prepared by employing the changed hash algorithm at a timing at which the hash algorithm is changed, and can be individually updated by employing the highest intensity hash algorithm at a timing at which the authentication of the user is executed, which makes it possible to avoid stopping the utilization of the authenticating system for a purpose of re-preparing the user information.

Further, the authenticating program of the present invention, which is an authenticating program for causing a client apparatus and a server apparatus connected via a communication line to execute an authenticate of a user of the client apparatus by employing a hash algorithm, is configured so that: the client apparatus is caused to function as: an authenticating information inputter for inputting authentication information including identification information and a password of the user: and a client-side hash value creator for creating a first hash value from the authentication information by employing a first hash algorithm that corresponds to a first hash algorithm identifier transmitted from the server apparatus, and creating a second hash value from the first hash value and a random number transmitted from the server apparatus by employing the first hash algorithm; and an authentication request manager for transmitting authentication request information for causing the server apparatus to start an authenticating process to the server apparatus, receiving the random number and the first hash algorithm identifier from the server apparatus, transmitting the identification information of the user input from the authentication information inputter and the second hash value to the server apparatus, and receiving an authentication result from the server apparatus; and the server apparatus is caused to function as: a random number creator for creating a random number; a server-side hash value creator for creating a hash value; and an authentication information manager for, upon receipt of the authentication request information from the client apparatus, causing the random number creator to create a random number, and transmitting the random number and the predetermined first hash algorithm identifier to the client apparatus, and for, upon receipt of the identification information of the user and the second hash value from the client apparatus, acquiring the user information, which corresponds to this received identification information of the user, from a user information storage in which user information has been stored that includes a second hash algorithm identifier that respectively corresponds for each identification information of the user, and a third hash value pre-created from the authentication information including the identification information and the password of the user by employing the second hash algorithm that corresponds to this hash algorithm identifier, determining whether or not the second hash algorithm identifier, which is included in the acquired user information, coincides with the first hash algorithm identifier, causing the server-side hash value creator to create a fourth hash value from a third hash value, which is included in the acquired user information, and the random number by employing the first hash algorithm in a case where it coincides, determining whether or not the second hash value coincides with the fourth hash value, transmitting the authentication result indicating that the authentication is successful to the client apparatus in a case where it coincides, and transmitting the authentication result indicating that the authentication is unsuccessful to the client apparatus in a case where it does not coincide.

The authenticating program of the present invention is configured so that: the authentication information manager in the server apparatus is caused to transmit the second hash algorithm identifier to the client apparatus as hash algorithm change request information in a case of having determined that the second hash algorithm identifier does not coincides with the first hash algorithm identifier; the authentication information inputter in the client apparatus is caused to re-input the identification information, a password, and a new password of the user when the second hash algorithm identifier is received by the authentication request manager in the client apparatus; the client-side hash value creator in the client apparatus is caused to create a new third hash value from the identification information and the password of the user, which were re-input, by employing the second hash algorithm, to create a new fourth hash value from the new third hash value and the random number by employing the first hash algorithm, and further to create a fifth hash value from the identification information and the new password of the user, which were re-input, employing the first hash algorithm; the authentication request manager in the client apparatus is caused to transmit the identification information of the user, the new fourth hash value, and the fifth hash value to the server apparatus; the server-side hash value creator in the server apparatus is caused to create a fourth hash value from the third hash value, which is included in the acquired user information, and the random number by employing the first hash algorithm when the identification information of the user, the new fourth hash value, and the fifth hash value are received by the authentication information manager in the server apparatus; and the authentication information manager in the server apparatus is caused to determine whether or not the fourth hash value coincides with the new fourth hash value, to respectively update the second hash algorithm identifier and the third hash value that correspond to the identification information of the user in the user information storage into the first hash algorithm identifier and the fifth hash value and to transmit the authentication result indicating that the authentication is successful to the client apparatus in a case where it coincides, and to transmit the authentication result indicating that the authentication is unsuccessful to the client apparatus in a case where it does not coincide.

Further, the authenticating program of the present invention is configured so that: the client apparatus is caused to function as a hash algorithm identifier storage in which a list of hash algorithm identifiers has been stored that are usable in the above client apparatus; the server apparatus is caused to function as a hash algorithm intensity storage in which an intensity of the hash algorithm has been stored that corresponds for each identifier of the hash algorithm; the authentication request manager in the client apparatus is caused to transmit the list of the hash algorithm identifiers to the server apparatus at the time of transmitting the authentication request information to the server apparatus; and the authentication information manager in the server apparatus is caused to select an identifier of the hash algorithm having a highest intensity from among the list of the hash algorithm identifiers based upon the intensity of each hash algorithm stored in the hash algorithm intensity storage when the authentication request information and the list of the hash algorithm identifiers are received from the client apparatus, and to transmit this selected identifier as the first hash algorithm identifier together with the random number to the client apparatus.

Configuring the authenticating program in such a manner makes it possible to gradually change the hash algorithm in each apparatus in a case of changing the hash algorithm that is used in the authenticating system to the hash algorithm having a higher intensity, or the like.

Further, the user information in the server apparatus does not need to be pre-prepared by employing the changed hash algorithm at a timing at which the hash algorithm is changed, and can be individually updated by employing the highest intensity hash algorithm at a timing at which the authentication of the user is executed, which makes it possible to avoid stopping the utilization of the authenticating system for a purpose of re-preparing the user information.

BRIEF DESCRIPTION OF THE DRAWINGS

This and other objects, features and advantages of the present invention will become more apparent upon a reading of the following detailed description and drawings, in which:

FIG. 4 is a view illustrating a user information management table 24 in the authenticating system of one exemplary embodiment of the present invention;

FIG. 5 is a view for explaining variables that are transmitted/received between an authentication client apparatus and an authentication server apparatus in the authenticating system of one exemplary embodiment of the present invention;

EXEMPLARY EMBODIMENTS

Hereinafter, an exemplary embodiment of the authenticating system relating to the present invention will be explained by making a reference to the accompanied drawings.

Additionally, the authenticating system of the present invention shown in the following exemplary embodiment is adapted to be operated by a computer-controlled program. A CPU of the computer sends a command to each component of the computer based upon the program, and causes each component to execute the predetermined processes necessary for operations of the authentication client apparatus and the authentication server apparatus, for example, a process of creating a hash value from a user ID and a password by employing a predetermined hash algorithm, a process of comparing each of the hash values created by the authentication client apparatus and the authentication server apparatus, respectively, with the other, and so on. In such a manner, each process and each operation in the authenticating system of the present invention can be realized with specific device in which the program and the computer co-work.

The program, which is pre-filed into the recording mediums such as a ROM and a RAM, is loaded from the recording medium packed in a computer into the above computer and is executed, can be also loaded into the computer, for example, via a communication line.

Further, the recording medium for filing the program can be configured of, for example, a semiconductor memory, a magnetic disc, an optical disc, or an optional recording device that is readable by an optional computer in addition hereto.

Figure 1:
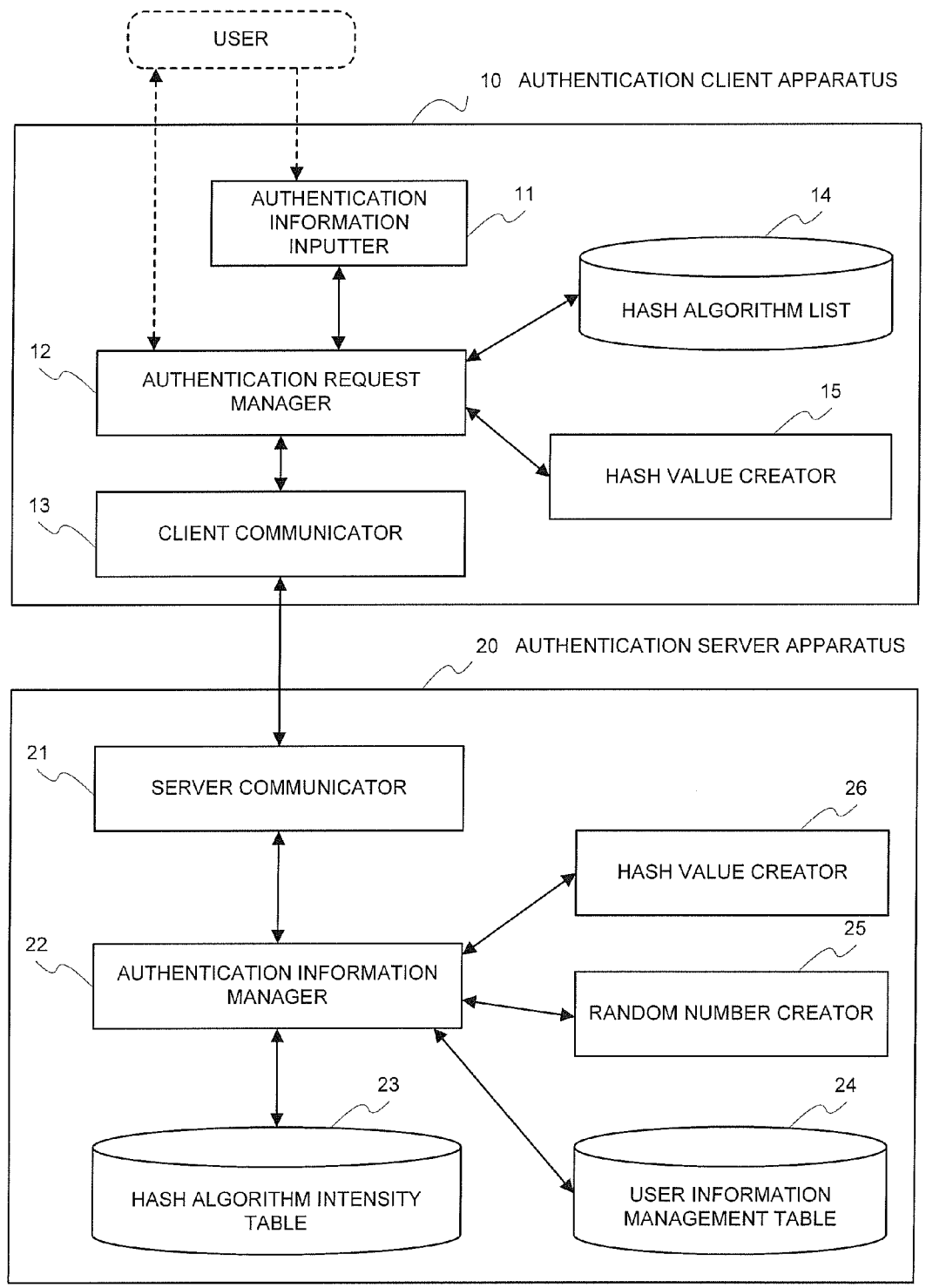
FIG. 1 is a block diagram illustrating a configuration of the authenticating system of one exemplary embodiment of the present invention.
Figures 2, 3:
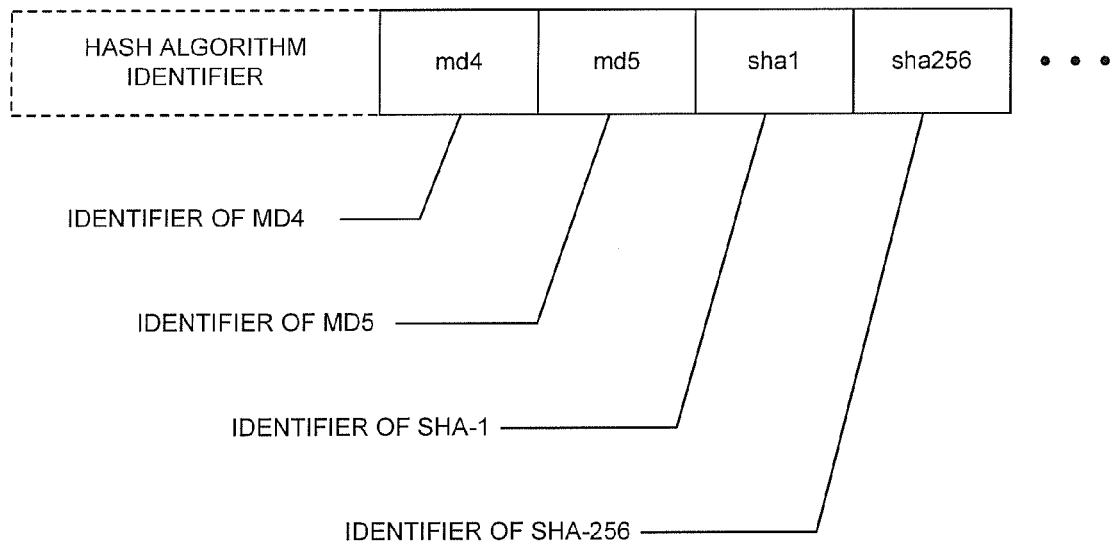
FIG. 2 is a view illustrating a hash algorithm list 14 in the authenticating system of one exemplary embodiment of the present invention.
FIG. 3 is a view illustrating a hash algorithm intensity table 23 in the authenticating system of one exemplary embodiment of the present invention.

At first, a configuration of one exemplary embodiment of the present invention will be explained by making a reference to FIG. 1 to FIG. 4. FIG. 1 is a block diagram illustrating a configuration of the authenticating system of this exemplary embodiment. FIG. 2 is a view illustrating a hash algorithm list 14 in the same authenticating system. FIG. 3 is a view illustrating a hash algorithm intensity table 23 in the same authenticating system. FIG. 4 is a view illustrating a user information management table 24 in the same authenticating system.

As shown in FIG. 1, the authenticating system of this exemplary embodiment, which is a system for executing an authentication by combining of the user ID and the password, includes an authentication client apparatus 10 and an authentication server apparatus 20.

The authentication client apparatus 10, which has a function of receiving an authentication request by the user and an input of authentication information, requesting the authentication of the authentication server apparatus 20, notifying an authentication result to the user, and so on, includes an authentication information inputter 11, an authentication request manager 12, a client communicator 13, a hash algorithm list 14, and a hash value creator 15 as shown in FIG. 1.

The authentication information inputter 11 has a function of receiving the input of the authentication information by the user based upon a request by the authentication request manager 12, and a function of delivering the authentication information that was input to the authentication request manager 12.

That is, upon inputting information of a request for inputting the authentication information from the authentication request manager 12, the authentication information inputter 11 outputs an authentication information input screen etc. for urging the user to input the authentication information to a displaying device in the authentication client apparatus 10, which is not shown in the figure, and inputs the authentication information by the user's operation. And, the authentication information inputter 11 outputs this authentication information that was input to the authentication request manager 12. Additionally, the so-called input request information is information that becomes a trigger, and the optional content can be employed as a content of the information. With various kinds of request information described below, the optional content thereof can be employed, and needless to say, the information that is employed in the subsequent process, for example, a hash algorithm identifier etc. can be employed as request information.

The authentication request manager 12 has a function of, based upon the authentication request by the user, acquiring a list of the hash algorithm identifiers from the hash algorithm list 14, and delivering it to the client communicator 13, a function of, upon acquiring a challenge (a random number and a highest-intensity hash algorithm identifier) from the client communicator 13, requesting the authentication information inputter 11 to receive the authentication information, a function of, upon acquiring the authentication information (the user ID and the password) from the authentication information inputter 11, delivering the highest-intensity hash algorithm identifier, the user ID, the password, and so on to the hash value creator 15, and acquiring a created hash value from the hash value creator 15, and a function of delivering the hash value to the client communicator 13, acquiring a request for changing the hash algorithm and an authentication result from the client communicator 13, and notifying the authentication result to the user.

That is, upon inputting the authentication request information from an inputting device, which is not shown in the figure, by the user's operation, the authentication request manager 12 acquires a list of the hash algorithm identifiers from the hash algorithm list 14, and outputs the acquired list of the hash algorithm identifiers to the client communicator 13.

Further, upon inputting the challenge (the random number and the highest-intensity hash algorithm identifier) from the client communicator 13, the authentication request manager 12 outputs information of a request for receiving the authentication information to the authentication information inputter 11.

In addition hereto, upon inputting the authentication information (the user ID and the password) from the authentication information inputter 11, the authentication request manager 12 outputs the highest-intensity hash algorithm identifier, the user ID, the password, and so on to the hash value creator 15. And, it inputs a created hash value from the hash value creator 15.

Further, the authentication request manager 12 outputs the hash value to the client communicator 13, inputs the request for changing the hash algorithm and the authentication result from the client communicator 13, and outputs the authentication result that was input to a displaying device, a printing device, or the like in the authentication client apparatus 10, which is not shown in the figure, for a purpose of enabling the user to make a reference hereto.

The details of these process that are executed by the authentication request manager 12 will be described later by employing FIG. 6 and FIG. 7.

The client communicator 13 has a function of transmitting the information acquired from the authentication request manager 12 to the server communicator 21, and a function of delivering the information received from the server communicator 21 to the authentication request manager 12.

That is, the client communicator 13 transmits various kinds of the information input from the authentication request manager 12 to the server communicator 21 via the communication line. Further, upon receipt of various kinds of the information transmitted from the server communicator 21 via the communication line, the client communicator 13 outputs this received information to the authentication request manager 12.

The hash algorithm list 14 is a storage in which a list of the hash algorithm identifiers has been stored that are usable in the hash value creator 15 of the authentication client apparatus 10. The data structure of a list of the hash algorithm identifiers that is stored in this hash algorithm list 14 can assume, for example, a structure shown in FIG. 2. In an example of the same figure, the algorithms such as MD4, MD5, SHA-1, and SHA-256 are stored, respectively, as a hash algorithm that can be used by the hash value creator 15 of the authentication client apparatus 10.

The hash value creator 15 has a function of creating the hash value based upon the information acquired from the authentication request manager 12, and delivering the created hash value to the authentication request manager 12.

That is, upon inputting a certain hash algorithm identifier, and information that becomes a source for creating the hash value from the authentication request manager 12, the hash value creator 15 creates the hash value with the hash algorithm (for example, the MD4, and the SHA-1) that corresponds to the hash algorithm identifier, which was input, by employing the input information that becomes a source for creating the hash value. And, the hash value creator 15 outputs the created hash value to the authentication request manager 12.

The authentication server apparatus 20, which has a function of executing the authenticating process responding to the authentication request by the authentication client apparatus 10, and returning its result to the authentication client apparatus 10, as shown in FIG. 1, includes a server communicator 21, an authentication information manager 22, a hash algorithm intensity table 23, a user information management table 24, a random number creator 25, and a hash value creator 26.

The server communicator 21 has a function of delivering the information received from the client communicator 13 to the authentication information manager 22, and a function of transmitting the information acquired from the authentication information manager 22 to the client communicator 13.

That is, upon receipt of various kinds of the information transmitted from the client communicator 13 via the communication line, the server communicator 21 outputs this received information to the authentication information manager 22. Further, the server communicator 21 transmits various kinds of the information input from the authentication information manager 22 to the client communicator 13 via the communication line.

The authentication information manager 22 has a function of, upon acquiring the authentication request and a list of the hash algorithm identifiers from the server communicator 21, acquiring an intensity of each hash algorithm from the hash algorithm intensity table 23, and selecting a highest-intensity hash algorithm in a list of the hash algorithm identifiers, a function of acquiring the random number from the random number creator 25, a function of delivering the challenge (the highest-intensity hash algorithm identifier and the random number) to the server communicator 21, and acquiring the user ID and the hash value from the server communicator 21, a function of acquiring the user information that corresponds to the designated user ID from the user information management table 24, a function of delivering the highest-intensity hash algorithm identifier, the random number, the hash value input from the server communicator 21, and so on to the hash value creator 15, and acquiring the created hash value from the hash value creator 15, a function of comparing the hash value created by the hash value creator 15 with the hash value input from the server communicator 21, and determining success or failure of the authentication, and a function of updating the highest-intensity hash algorithm identifier and the hash value that correspond to the user ID for the user information management table 24.

That is, upon inputting the authentication request information and a list of the hash algorithm identifiers from the server communicator 21, the authentication information manager 22 acquires the intensity of each hash algorithm from the hash algorithm intensity table 23. At this time, the authentication information manager 22 can acquire only the intensity that correspond to the hash algorithm identifier in a list of the hash algorithm identifiers input from the server communicator 21 in addition of acquirement of intensities that correspond to all hash algorithm identifiers stored in the hash algorithm intensity table 23. And, the authentication information manager 22 selects the identifier (the highest-intensity hash algorithm identifier) of the hash algorithm having a highest intensity out of a list of the hash algorithm identifiers.

Further, upon selecting the highest-intensity hash algorithm identifier, the authentication information manager 22 requests the random number creator 25 to generate the random number, and inputs it from the random number creator 25.

Further, upon inputting the random number from the random number creator 25, the authentication information manager 22 outputs these random number and highest-intensity hash algorithm identifier as a challenge to the server communicator 21, and inputs the user ID and the hash value from the server communicator 21.

In addition hereto, the authentication information manager 22, based upon the user ID input from the server communicator 21, acquires the user information that corresponds to this user ID from the user information management table 24.

Further, the authentication information manager 22 outputs the highest-intensity hash algorithm identifier, the random number, the hash value input from the server communicator 21, and so on to the hash value creator 26, and inputs from the hash value creator 26 the hash value created by the above hash value creator 26.

Further, the authentication information manager 22 compares the hash value created by the hash value creator 26 with the hash value input from the server communicator 21, determines that the authentication is successful if each of them coincides with the other, and that the authentication is unsuccessful if each of them does not coincide with the other, and outputs this determination result to the server communicator 21.

In addition hereto, the authentication information manager 22 updates the hash algorithm identifier and the hash value that correspond to the user ID for the user information management table 24 in a case where each of them coincides with the other.

The details of each process mentioned above that is executed by the authentication information manager 22 will be described later by employing FIG. 10 and FIG. 11.

The hash algorithm intensity table 23 is a storage in which a list of the hash algorithm identifiers has been stored that are usable in the hash value creator 26 of the authentication server apparatus 20, and intensities of respective hash algorithms. The data structure of this hash algorithm intensity table 23 can assume, for example, a structure shown in FIG. 3. In the same figure, it is shown that respective intensities, which are caused to correspond to respective identifiers indicating the hash algorithms MD4, MD5, SHA-1, and SHA-256, are 1, 1, 2, and 3.

The user information management table 24, which is a storage in which the hash value created from the user ID and the password user ID by user ID, and the identifier of the hash algorithm used at this moment as user information have been stored, pre-stores these items of the information prior to execution of the authenticating process in the authenticating system of this exemplary embodiment. This user information management table 24 can assume, for example, a table shown in FIG. 4.

The random number creator 25 has a function of creating the random number based upon a request by the authentication information manager 22, and delivering the created random number to the authentication information manager 22.

That is, upon inputting information of a request for creating the random number by the authentication information manager 22, the random number creator 25 creates the random number with a predetermined computing method, and outputs the created random number to the authentication information manager 22. The computing method that is employed by the random number creator 25 is optional so long as it enables the random number to be created.

The hash value creator 26 has a function of creating the hash value based upon the information input from the authentication information manager 22, and a function of delivering the created hash value to the authentication information manager 22.

That is, upon inputting a predetermined hash algorithm identifier and information that becomes a source for creating the hash value from the authentication information manager 22, the hash value creator 26 creates the hash value with the hash algorithm, which corresponds to the hash algorithm identifier that was input, by employing this input information that becomes a source for creating the hash value, and outputs the created hash value to the authentication information manager 22.

Figure 8:
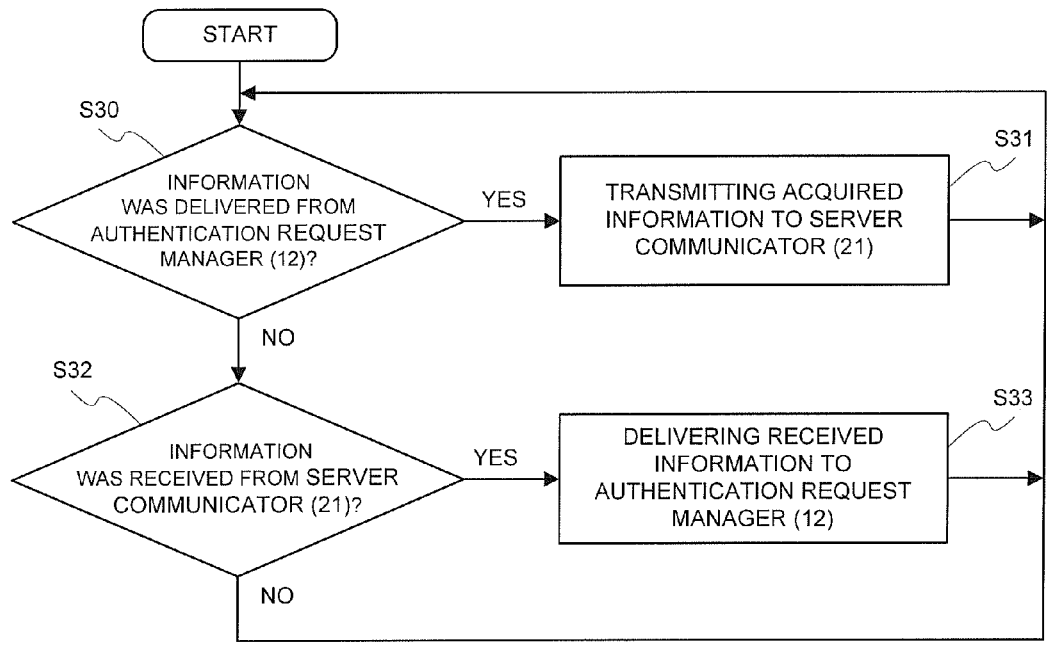
FIG. 8 is a flowchart illustrating a process procedure by a client communicator 13 in the authenticating system of one exemplary embodiment of the present invention.
Figure 9:
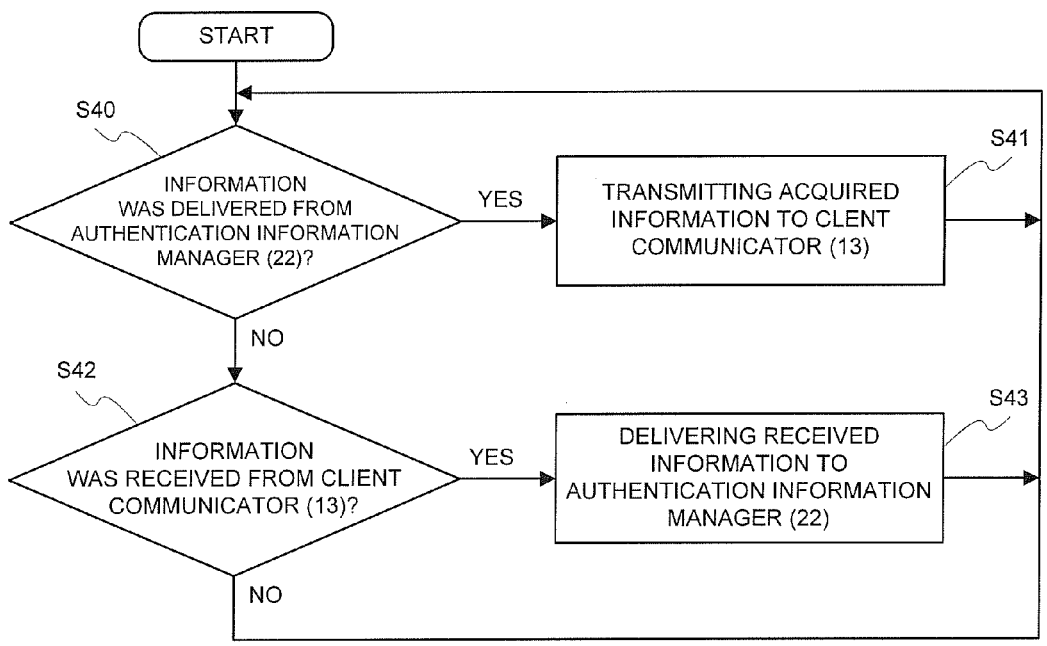
FIG. 9 is a flowchart illustrating a process procedure by a server communicator 21 in the authenticating system of one exemplary embodiment of the present invention.
Figure 12:
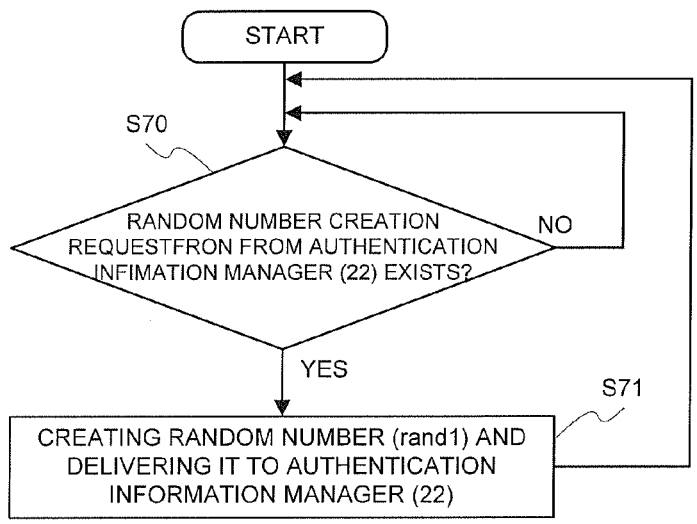
FIG. 12 is a flowchart illustrating a process procedure by a random number creator 25 in the authenticating system of one exemplary embodiment of the present invention.
Figure 13:
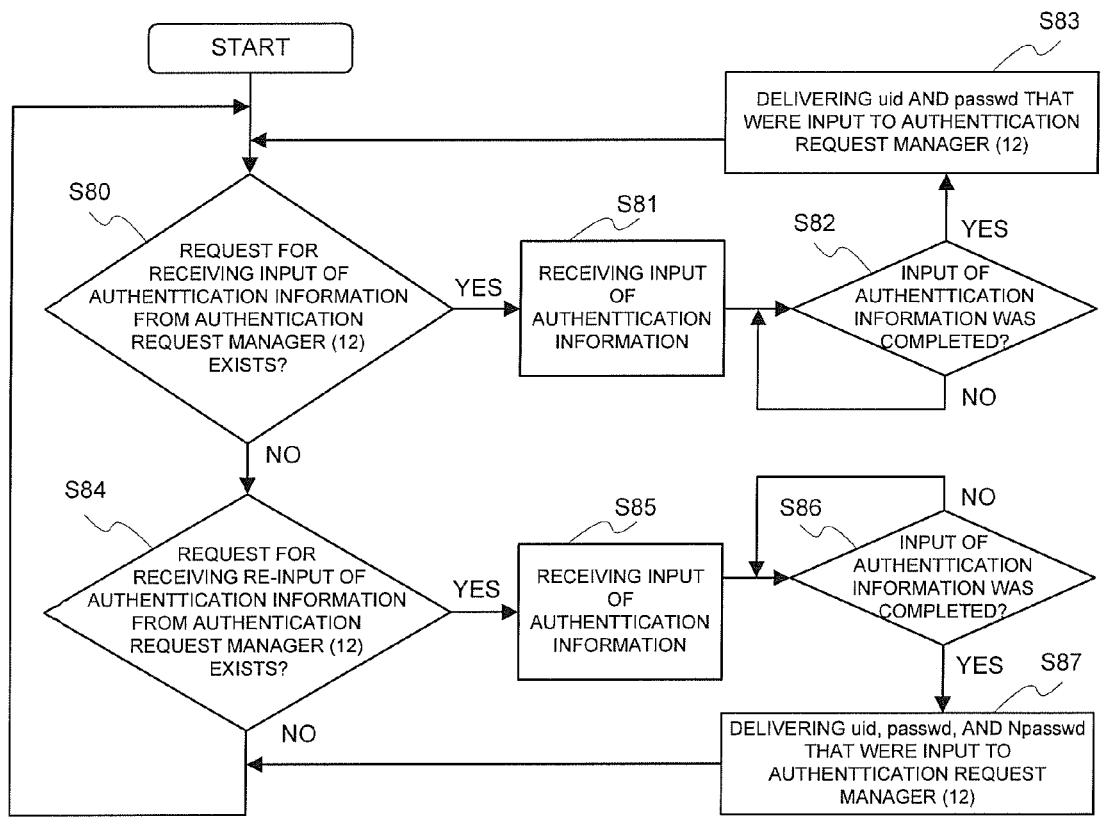
FIG. 13 is a flowchart illustrating a process procedure by an authentication information inputter 11 in the authenticating system of one exemplary embodiment of the present invention.
Figure 14:
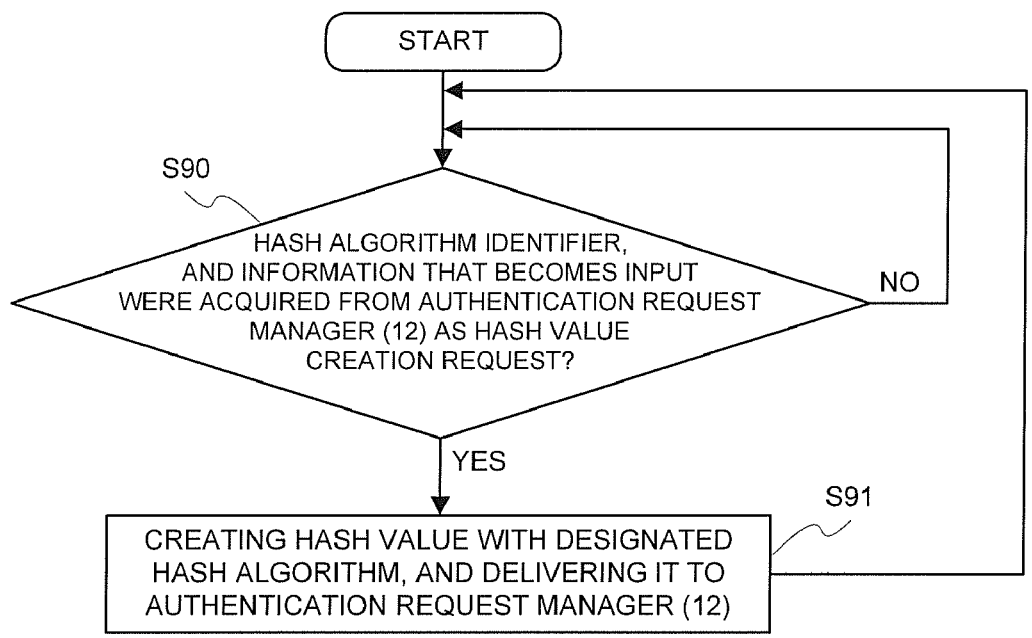
FIG. 14 is a flowchart illustrating a process procedure by a hash value creator 15 of the authentication client apparatus in the authenticating system of one exemplary embodiment of the present invention.
Figure 15:
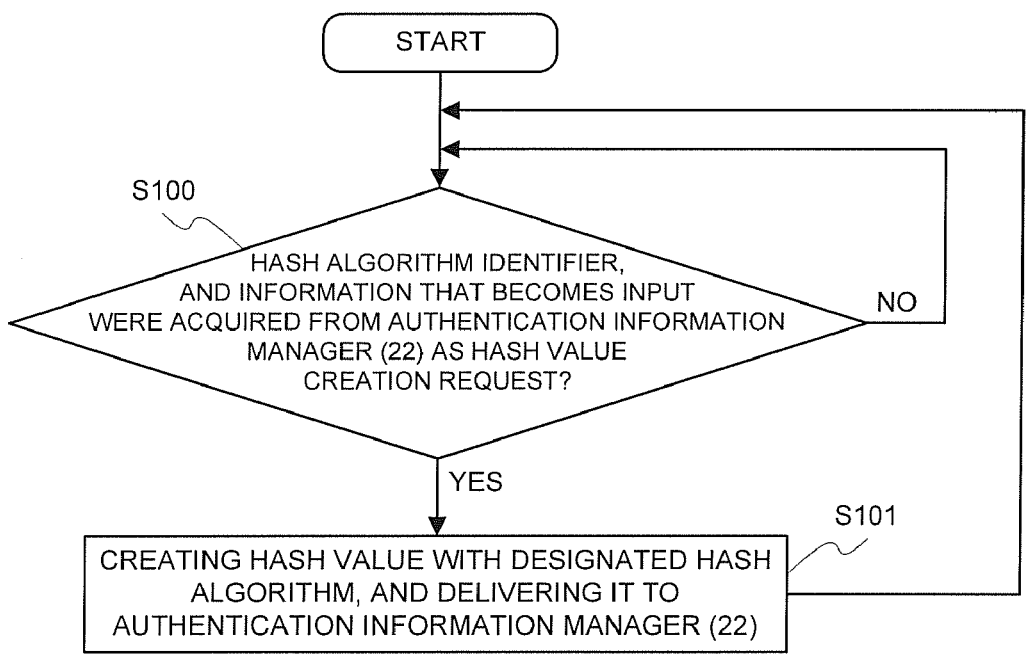
FIG. 15 is a flowchart illustrating a process procedure by a hash value creator 26 of the authentication server apparatus in the authenticating system of one exemplary embodiment of the present invention.

Next, the process procedure in the authenticating system in this exemplary embodiment will be explained by making a reference to FIG. 5 to FIG. 15. FIG. 5 is a view illustrating a definition of variables in the authenticating system in this exemplary embodiment. FIG. 6 and FIG. 7 are a flowchart illustrating a process procedure by the authentication request manager 12 in the authenticating system, respectively. FIG. 8 is a flowchart illustrating a process procedure by the client communicator 13 in the same authenticating system. FIG. 9 is a flowchart illustrating a process procedure by the server communicator 21 in the same authenticating system. FIG. 10 and FIG. 11 are a flowchart illustrating a process procedure by the authentication information manager 22 in the same authenticating system, respectively. FIG. 12 is a flowchart illustrating a process procedure by the random number creator 25 in the same authenticating system. FIG. 13 is a flowchart illustrating a process procedure by the authentication information inputter 11 in the same authenticating system. FIG. 14 is a flowchart illustrating a process procedure by the hash value creator 15 of the authentication client apparatus in the same authenticating system. FIG. 15 is a flowchart illustrating a process procedure by the hash value creator 26 of the authentication server apparatus in the same authenticating system.

At first, the variables that are transmitted/received between the authentication client apparatus and the authentication server apparatus in the authenticating system of this exemplary embodiment will be explained by making a reference to FIG. 5.

rand1 is a variable indicative of the random number created by the random number creator 25. Hereinafter, it is referred to as a random number in some cases.

sHash_alg_id is a variable indicative of the identifier of the hash algorithm having a highest intensity out of the hash algorithms that can be used by both of the authentication client apparatus 10 and the authentication server apparatus 20. Hereinafter, it is referred to as a highest-intensity hash algorithm identifier in some cases.

uid is a variable indicative of the user ID input into the authentication information inputter 11 by the user's operation. Hereinafter, it is referred to as a user ID in some cases.

passwd is a variable indicative of the password input into the authentication information inputter 11 by the user's operation. Hereinafter, it is referred to as a password in some cases.

uid_passwd_sHashV is a variable indicative of the hash value created according to the hash algorithm that sHash_alg_id indicates by employing uid and passwd as information that becomes a source for computing the hash value. Hereinafter, it is referred to as a first hash value in some cases.

uid_passwd_sHashV_rand1_sHashV is a variable indicative of the hash value created according to the hash algorithm that sHash_alg_id indicates by employing uid_passwd_sHashV and rand1 as information that becomes a source for computing the hash value. Hereinafter, it is referred to as a second hash value in some cases.

uHash_alg_id is a variable indicative of the hash algorithm identifier in the user information stored uid by uid in the user information management table 24. Hereinafter, it is referred to as a user ID correspondence hash algorithm identifier in some cases.

uid_passwd_uHashV is a variable indicative of the hash value created according to the hash algorithm that uHash_alg_id indicates by employing uid and passwd as information that becomes a source for computing the hash value. Hereinafter, it is referred to as a third hash value in some cases.

uid_passwd_uHashV_rand1_sHashV is a variable indicative of the hash value created according to the hash algorithm that sHash_alg_id indicates by employing uid_passwd_uHashV and rand1 as information that becomes a source for computing the hash value. Hereinafter, it is referred to as a fourth hash value in some cases.

Npasswd is a variable indicative of a new password input by the user. Hereinafter, it is referred to as a new password in some cases.

uid_Npasswd_sHashV is a variable indicative of the hash value created according to the hash algorithm that sHash_alg_id indicates by employing uid and Npasswd as information that becomes a source for computing the hash value. Hereinafter, it is referred to as a fifth hash value in some cases.

<Process procedure A: the case that the highest-intensity hash algorithm that is common to the authentication client apparatus and the authentication server apparatus is identical to the hash algorithm used for creating the hash value in the user information>

Next, the process procedure in the authenticating system in the case that the highest-intensity hash algorithm that is common to the authentication client apparatus 10 and the authentication server apparatus 20 is identical to the hash algorithm used for creating the hash value stored in the user information management table 24 will be explained by employing FIG. 6 to FIG. 15.

At first, in a case of using the authentication client apparatus 10 to request the authentication of the authentication server apparatus 20, the user operates the inputting device, which is not shown in the figure, to input authentication request information into the authentication client apparatus 10.

Figure 6:
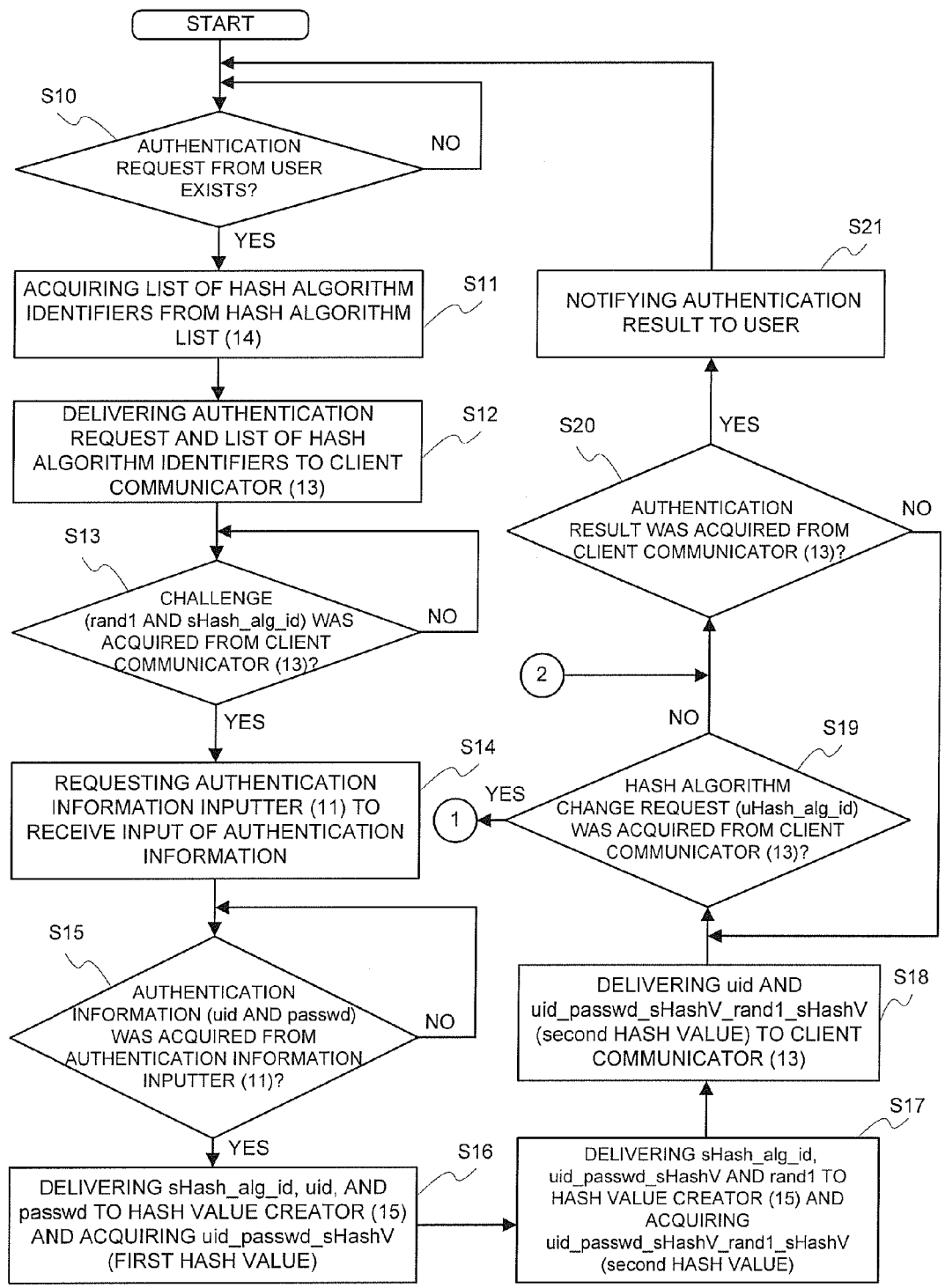
FIG. 6 is a flowchart illustrating a process procedure by an authentication request manager 12 in the authenticating system of one exemplary embodiment of the present invention.

The authentication request manager 12, as shown in FIG. 6, monitors whether the authentication request information is input into the authentication client apparatus 10, and in a case where the authentication request information has been input (Yes of step 10), acquires a list of the hash algorithm identifiers from the hash algorithm list 14 (step 11).

And, the authentication request manager 12 outputs the authentication request information and the acquired list of the hash algorithm identifiers to the client communicator 13 (step 12).

Additionally, the authentication request information is information that plays a role of a trigger for executing the authentication in the authentication client apparatus 10, and its configuration is not limited particularly, so optional information can be employed as the authentication request information.

Next, upon inputting the authentication request information and a list of the hash algorithm identifiers from the authentication request manager 12 as shown in FIG. 8 (Yes of step 30), the client communicator 13 transmits these items of the information to the server communicator 21 (step 31).

Next, upon receipt of the authentication request information and a list of the hash algorithm identifiers from the client communicator 13 as shown in FIG. 9 (No of step 40, and Yes of step 42), the server communicator 21 outputs these items of the information to the authentication information manager 22 (step 43).

Figure 10:
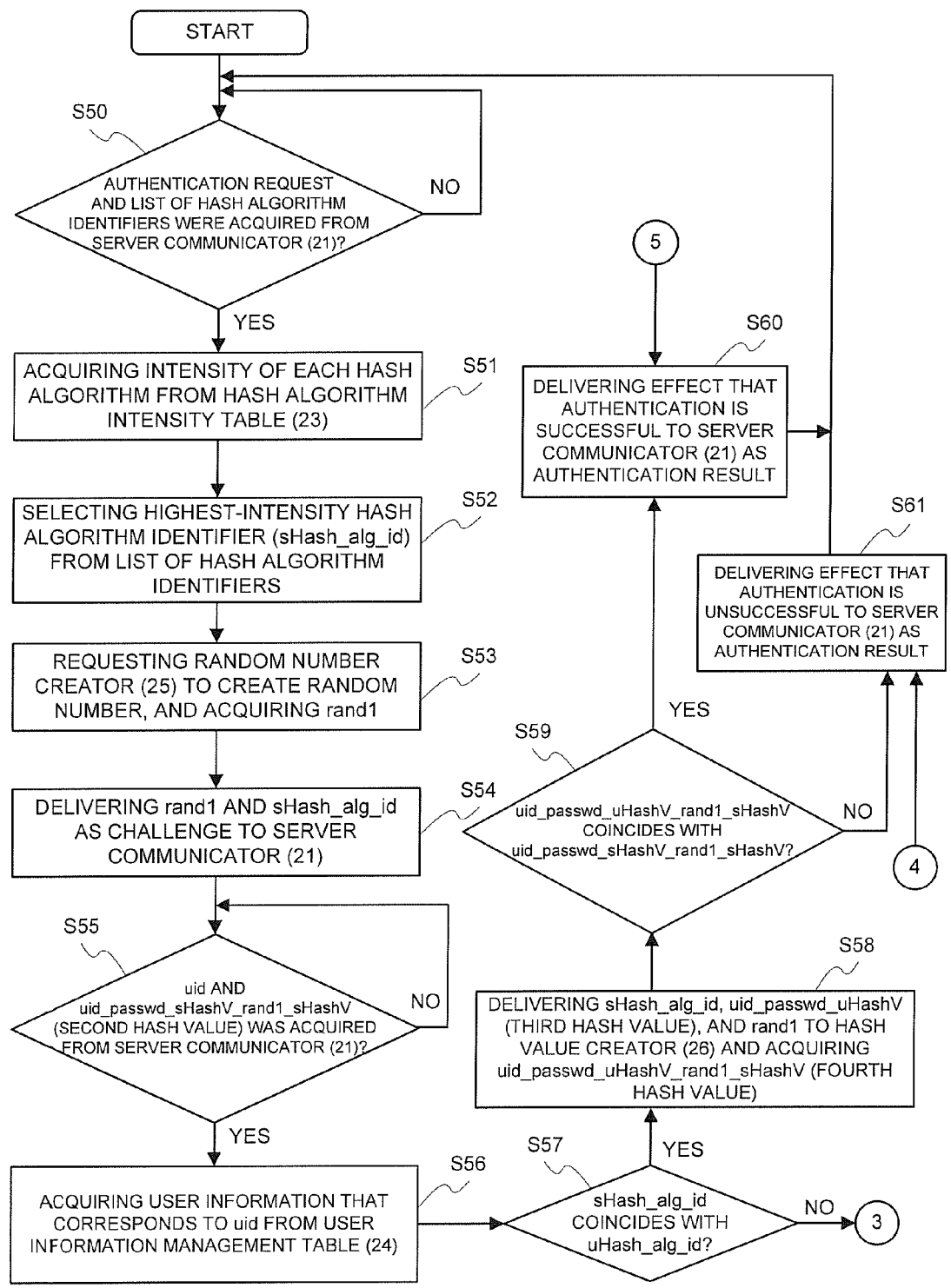
FIG. 10 is a flowchart illustrating a process procedure by an authentication information manager 22 in the authenticating system of one exemplary embodiment of the present invention.

Next, upon inputting the authentication request information and a list of the hash algorithm identifiers from the server communicator 21 as shown in FIG. 10 (Yes of step 50), the authentication information manager 22 acquires the intensity of each hash algorithm from the hash algorithm intensity table 23 (step 51).

And, the authentication information manager 22 selects the identifier (sHash_alg_id: highest-intensity hash algorithm identifier) of the hash algorithm having a highest intensity out of the hash algorithms of which the identifier exists in a list of the hash algorithm identifiers based upon the by-hash-algorithm intensity acquired from the hash algorithm intensity table 23 and a list of the hash algorithm identifiers (step 52).

Additionally, in a case where the identifier existing in a list of the hash algorithm identifiers does not exist in the hash algorithm intensity table 23, and yet the hash algorithm that can be sharedly used in the authentication client apparatus 10 and the authentication server apparatus 20 does not exist, the authentication information manager 22 can perform the process etc. of returning response information saying that a connection is refused to the authentication request manager 12 in the authentication client apparatus 10 via the server communicator 21 and the client communicator 13.

In addition hereto, the authentication information manager 22 outputs information of a request for creating the random number to the random number creator 25, and acquires the random number (rand1) from the random number creator 25 (step 53).

At this time, upon inputting the information of a request for creating the random number from the authentication information manager 22 as shown in FIG. 12 (Yes of step 70), the random number creator 25 creates the random number (rand1), and outputs the created random number to the authentication information manager 22 (step 71).

Additionally, the method of creating the random number that is employed at this time is not particularly limited, and optional preferred method can be employed as a method of creating the random number.

Next, the authentication information manager 22, as shown in FIG. 10, outputs the acquired random number (rand1) and highest-intensity hash algorithm identifier (sHash_alg_id) as a challenge to the server communicator 21 (step 54).

Upon inputting the random number (rand1) and the highest-intensity hash algorithm identifier (sHash_alg_id) from the authentication information manager 22 as shown in FIG. 9 (Yes of step 40), the server communicator 21 transmits these items of the information to the client communicator 13 (step 41).

Upon receipt of the random number (rand1) and the highest-intensity hash algorithm identifier (sHash_alg_id) from the server communicator 21 as shown in FIG. 8 (No of step 30 and Yes of step 32), the client communicator 13 outputs these items of the information to the authentication request manager 12 (step 33).

Upon inputting the challenge (the random number and the highest-intensity hash algorithm identifier) from the client communicator 13 as shown in FIG. 6 (Yes of step 13), the authentication request manager 12 outputs information of a request for receiving an input of the authentication information to the authentication information inputter 11 (step 14).

Upon inputting the information of a request for receiving an input of the authentication information from the authentication request manager 12 as shown in FIG. 13 (Yes of step 80), the authentication information inputter 11 receives the input of the authentication information (step 81).

The details of the method of inputting the authentication information is not particularly limited, and for example, the method of, by the user's operation, causing the displaying device in the authentication client apparatus 10, which is not shown in the figure, to display a screen having an input region provided for inputting the authentication information such as the user ID (uid) and the password (passwd), and causing the user to input the authentication information via the above screen is thinkable.

And, upon completing the input of the authentication information (uid and passwd) (Yes of step 82), the authentication information inputter 11 outputs this authentication information to the authentication request manager 12 (step 83).

Next, upon inputting the authentication information (uid and passwd) from the authentication information inputter 11 as shown in FIG. 6 (Yes of step 15), the authentication request manager 12 outputs this authentication information (uid and passwd) and the highest-intensity hash algorithm identifier (sHash_alg_id) to the hash value creator 15, and inputs the first hash value (uid_passwd_sHashV) from the hash value creator 15 (step 16)

At this time, upon inputting the highest-intensity hash algorithm identifier (sHash_alg_id) as information of a request for creating the hash value, and the authentication information (uid and passwd) as information that becomes an input, i.e. as input information that becomes a computation element for creating the hash value from the authentication request manager 12 as shown in FIG. 14 (Yes of step 90), the hash value creator 15 creates the first hash value (uid_passwd_sHashV) with the hash algorithm, which corresponds to this input identifier, by employing the authentication information (uid and passwd), and outputs the created first hash value to the authentication request manager 12 (step 91).

Next, the authentication request manager 12, as shown in FIG. 6, outputs the highest-intensity hash algorithm identifier (sHash_alg_id), and the first hash value (uid_passwd_sHashV) and the random number (rand1) as input information for creating the hash value to the hash value creator 15, and inputs the second hash value (uid_passwd_sHashV_rand1_sHashV) from the hash value creator 15 (step 17).

At this time, upon inputting the highest-intensity hash algorithm identifier (sHash_alg_id) as information of a request for creating the hash value, and the random number (rand1) and the first hash value (uid_passwd_sHashV), respectively, as input information for creating the hash value from the authentication request manager 12 as shown in FIG. 14 (Yes of step 90), the hash value creator 15 creates the second hash value (uid_passwd_sHashV_rand1_sHashV) with the hash algorithm, which corresponds to this input identifier, by employing the random number (rand1) and the first hash value (uid_passwd_sHashV), and outputs the created second hash value to the authentication request manager 12 (step 91).

Next, the authentication request manager 12 outputs the user ID (uid) and the second hash value (uid_passwd_sHashV_rand1_sHashV) to the client communicator 13 (step 18).

Upon inputting the user ID (uid) and the second hash value (uid_passwd_sHashV_rand1_sHashV) from the authentication request manager 12 as shown in FIG. 8 (Yes of step 30), the client communicator 13 transmits these items of the information to the server communicator 21 (step 31).

Upon receipt of the user ID (uid) and the second hash value (uid_passwd_sHashV_rand1_sHashV) from the client communicator 13 as shown in FIG. 9 (No of step 40 and Yes of step 42), the server communicator 21 outputs these items of the information to the authentication information manager 22 (step 43).

Next, upon inputting the user ID (uid) and the second hash value (uid_passwd_sHashV_rand1_sHashV) from the server communicator 21 as shown in FIG. 10 (Yes of step 55), the authentication information manager 22 extracts and acquires the user information that corresponds to the user ID (uid) from the user information management table 24 (step 56). This user information, as explained by making a reference to FIG. 4, includes the user ID, the pre-created third hash value, and the user ID correspondence hash algorithm identifier (uHash_alg_id).

Additionally, in a case where the user information that corresponds to the user ID (uid) does not exists in the user information management table 24, the authentication information manager 22 can perform the process etc. of returning the authentication result saying that the authentication is unsuccessful to the authentication request manager 12 via the server communicator 21 and the client communicator 13.

Next, the authentication information manager 22 compares the highest-intensity hash algorithm identifier (sHash_alg_id) with the user ID correspondence hash algorithm identifier (uHash_alg id), and determines whether or not it coincides (step 57).

In a case where each of these identifiers coincided with the other (Yes of step 57), the authentication information manager 22 outputs the identifier (sHash_alg_id) of the highest-intensity hash algorithm, and the third hash value (uid_passwd_uHashV) and the random number (rand1) in the user information, each of which is input information for creating the hash value, to the hash value creator 26, and inputs the fourth hash value (uid_passwd_uHashV_rand1_sHashV) from the hash value creator 26 (step 58)

At this time, upon inputting the highest-intensity hash algorithm identifier (sHash_alg_id) as information of a request for creating the hash value, and the third hash value (uid_passwd_uHashV) and the random number (rand1), respectively, as input information for creating the hash value from the authentication information manager 22 as shown in FIG. 15 (Yes of step 100), the hash value creator 26 creates the fourth hash value (uid_passwd_uHashV_rand1_sHashV) with the hash algorithm, which corresponds to this input identifier, by employing the third hash value (uid_passwd_uHashV) and the random number (rand1), and outputs the created fourth hash value to the authentication information manager 22 (step 101).

Next, the authentication information manager 22 compares the fourth hash value (uid_passwd_uHashV_rand1_sHashV) input from the hash value creator 26 with the second hash value (uid_passwd_sHashV_rand1_sHashV), and determines whether or not it coincides (step 59).

And, in a case where each of these hash values coincides with the other, the authentication information manager 22 outputs the effect that the authentication is successful to the server communicator 21 as an authentication result (step 60).

On the other hand, in a case where each of these hash values does not coincide with the other, the authentication information manager 22 outputs the effect that the authentication is unsuccessful to the server communicator 21 as an authentication result (step 61).

And, the server communicator 21 transmits this authentication result to the client communicator 13 (Yes of step 40, and step 41 of FIG. 9), and the client communicator 13 outputs the authentication result received from the server communicator 21 to the authentication request manager 12 (No of step 30, Yes of step 32, and step 33 of FIG. 8).

And, upon inputting the authentication result from the client communicator 13 (No of step 19, and Yes of step 20), the authentication request manager 12 notifies the authentication result to the user by outputting it, for example, to the displaying device in the authentication client apparatus 10, which is not shown in the figure (step 21).

<Process procedure B: the case that the highest-intensity hash algorithm that is common to the authentication client apparatus and the authentication server apparatus differs from the hash algorithm used for creating the hash value in the user information>

Next, the process procedure in the authenticating system in the case that the highest-intensity hash algorithm that is common to the authentication client apparatus 10 and the authentication server apparatus 20 differs from the hash algorithm used for creating the hash value stored in the user information management table 24 will be explained by employing FIG. 6 to FIG. 15.

At first, the process procedure ranging from the operation that in a case where the authentication request information has been input into the authentication client apparatus 10 (Yes of step 10 of FIG. 6), the authentication request manager 12 acquires a list of the hash algorithm identifiers from the hash algorithm list 14 (step 11 of FIG. 6) to the operation that the authentication information manager 22 compares the highest-intensity hash algorithm identifier (sHash_alg_id) with the user ID correspondence hash algorithm identifier (uHash_alg_id), and determines whether or not it coincides (step 57 of FIG. 10) is similar to that of the foregoing process procedure A.

Next, in the process procedure B, it is determined in step 57 of FIG. 10 that the highest-intensity hash algorithm identifier (sHash_alg_id) does not coincide with the user ID correspondence hash algorithm identifier (uHash_alg_id) (No of step 57).

At this time, the authentication information manager 22 outputs the user ID correspondence hash algorithm identifier (uHash_alg_id) as information of a request for changing the hash algorithm to the server communicator 21 (step 62).

Additionally, a configuration also can be made so that in a case where the intensity of the hash algorithm of the user ID correspondence hash algorithm identifier (uHash_alg_id) is higher than that of the hash algorithm of the highest-intensity hash algorithm identifier (sHash_alg_id), the authentication information manager 22 performs the process etc. of returning information saying that a connection is refused to the authentication request manager 12 via the server communicator 12 and the client communicator 13.

Next, the server communicator 21 transmits the information of a request for changing the hash algorithm (the user ID correspondence hash algorithm identifier (uHash_alg_id)) input from the authentication information manager 22 to the client communicator 13 (Yes of step 40, and step 41), and the client communicator 13 outputs the received information of a request for changing the hash algorithm to the authentication request manager 12 (No of step 30, Yes of step 32, and step 33).

Next, upon inputting the information of a request for changing the hash algorithm from the client communicator 13 as shown in FIG. 6 (Yes of step 19), the authentication request manager 12 outputs information of a request for receiving the re-input of the authentication information to the authentication information inputter 11 (step 22).

Additionally, in a case where the user ID (uid) and the password (passwd) acquired prior to the process of the step 14 have been stored in the predetermined storage in the authentication client apparatus 10 at the time that the authentication request manager 12 has input the information of a request for changing the hash algorithm from the client communicator 13, the information of a request for receiving the re-input of the authentication information does not need to be transmitted to the authentication information inputter 11.

In this case, with the process result of the step 23 taken as Yes, the password (passwd) and the new password (Npasswd) are put in the same category, and treated in the processes subsequent to step 24.

However, from a viewpoint of an enhancement in a security, the password (passwd) is desirably canceled at a time point that the hash value creator 15 used it as input information for creating the hash value in the step 16. This is similarly applied to the case as well that the hash value creator 15 employs the new password (Npasswd) to create the hash value in the step 24 and the step 26.

Next, upon inputting the information of a request for receiving the re-input of the authentication information from the authentication request manager 12 as shown in FIG. 13 (No of step 80 and Yes of step 84), the authentication information inputter 11 receives the input of the authentication information similarly to the case of the step 81 (step 85). However, in this case, the authentication information includes the new password (Npasswd) in addition to the user ID (uid) and the password (passwd).

And, upon completing the input of the authentication information (uid, passwd, and Npasswd) (Yes of step 86), the authentication information inputter 11 outputs this authentication information to the authentication request manager 12 (step 87).

Figure 7:
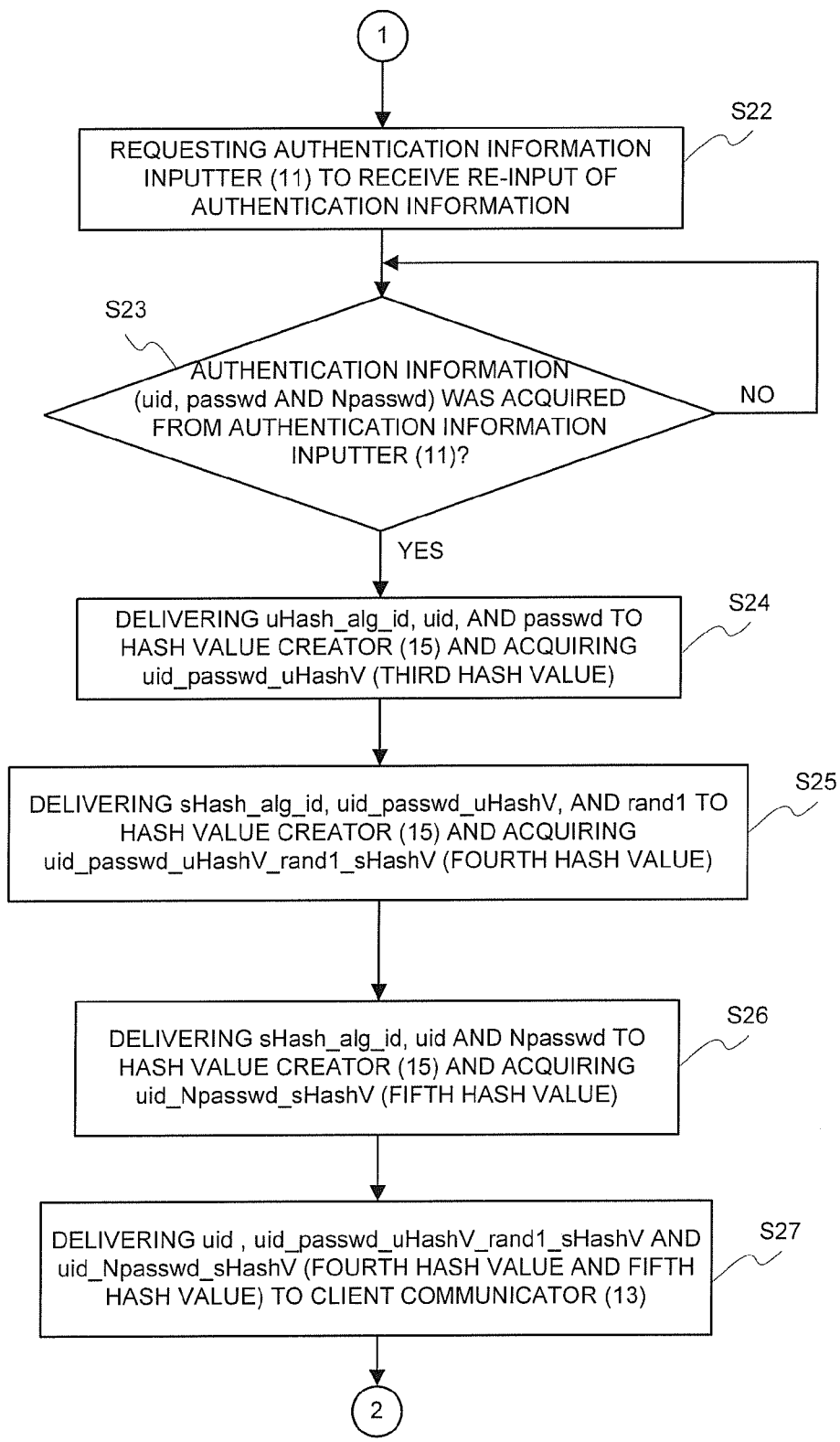
FIG. 7 is a flowchart illustrating a process procedure by the authentication request manager 12 in the authenticating system of one exemplary embodiment of the present invention.

Next, upon inputting the authentication information (uid, passwd, and Npasswd) from the authentication information inputter 11 as shown in FIG. 7 (Yes of step 23), the authentication request manager 12 outputs the user ID correspondence hash algorithm identifier (uHash_alg_id), and the user ID (uid) and the password (passwd) as input information for creating the hash value to the hash value creator 15, and inputs the third hash value (uid_passwd_uHashV) from the hash value creator 15 (step 24)

At this time, upon inputting the user ID correspondence hash algorithm identifier (uHash_alg_id) as information of a request for creating the hash value, and the user ID (uid) and the password (passwd), respectively, as input information for creating the hash value from the authentication request manager 12 as shown in FIG. 14 (Yes of step 90), the hash value creator 15 creates the third hash value (uid_passwd_uHashV) with the hash algorithm, which corresponds to this input identifier, by employing the user ID (uid) and the password (passwd), and outputs the created third hash value to the authentication request manager 12 (step 91).

Next, the authentication request manager 12, as shown in FIG. 7, outputs the highest-intensity hash algorithm identifier (sHash_alg_id), and the random number (rand1) and the third hash value (uid_passwd_uHashV) acquired in the step 24, respectively, as input information for creating the hash value to the hash value creator 15, and inputs the fourth hash value (uid_passwd_uHashV_rand1_sHashV) from the hash value creator 15 (step 25).

At this time, upon inputting the highest-intensity hash algorithm identifier (sHash_alg_id) as information of a request for creating the hash value, and the random number (rand1) and the third hash value (uid_passwd_uHashV) acquired by the authentication request manager 12 in the step 24 of FIG. 7, respectively, as input information for creating the hash value from the authentication request manager 12 as shown in FIG. 14 (Yes of step 90), the hash value creator 15 creates the fourth hash value (uid_passwd_uHashV_rand1_sHashV) with the hash algorithm, which corresponds to this input identifier, by employing the random number (rand1) and the third hash value (uid_passwd_uHashV), and outputs the created fourth hash value to the authentication request manager 12 (step 91).

Next, the authentication request manager 12, as shown in FIG. 7, outputs the highest-intensity hash algorithm identifier (sHash_alg_id), and the user ID (uid) and the new password (Npasswd), respectively, as input information for creating the hash value to the hash value creator 15, and inputs the fifth hash value (uid_Npasswd_sHashV) from the hash value creator 15 (step 26).

At this time, upon inputting the highest-intensity hash algorithm identifier (sHash_alg_id) as information of a request for creating the hash value, and the user ID (uid) and the new password (Npasswd), respectively, as input information for creating the hash value from the authentication request manager 12 as shown in FIG. 14 (Yes of step 90), the hash value creator 15 creates the fifth hash value (uid_Npasswd_sHashV) with the hash algorithm, which corresponds to this input identifier, by employing the user ID (uid) and the new password (Npasswd), and outputs the created fifth hash value to the authentication request manager 12 (step 91).

And, the authentication request manager 12 outputs the user ID (uid), the fourth hash value (uid_passwd_uHashV_rand1_sHashV) and the fifth hash value (uid_Npasswd_sHashV) acquired as mentioned above to the client communicator 13 (step 27).

The client communicator 13 transmits the user ID, the fourth hash value and the fifth hash value input from the authentication request manager 12 to the server communicator 21 (Yes of step 30, and step 31), and the server communicator 21 receives these items of the information, and outputs them to the authentication information manager 22 (No of step 40, Yes of step 42, and step 43).

Figure 11:
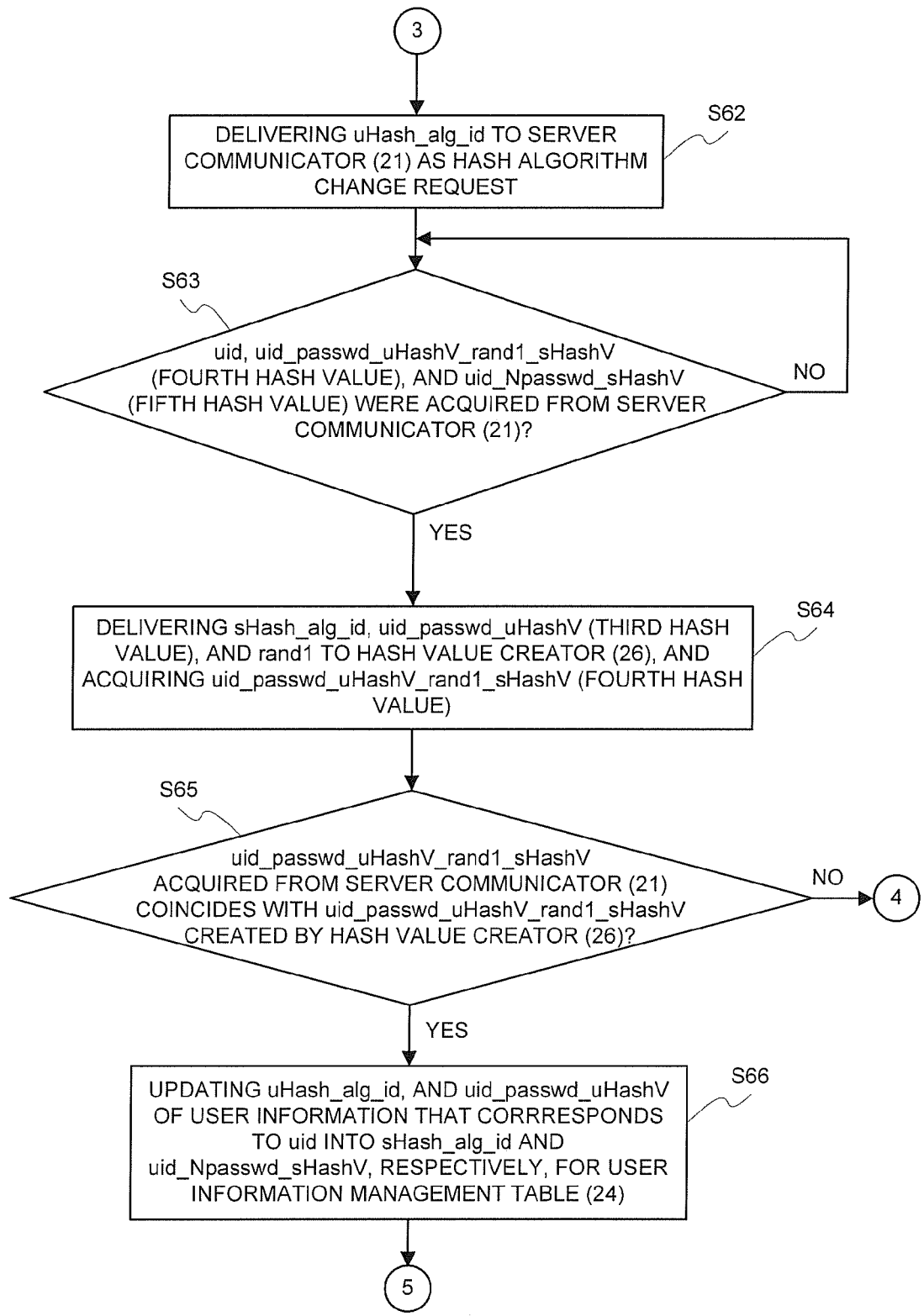
FIG. 11 is a flowchart illustrating a process procedure by the authentication information manager 22 in the authenticating system of one exemplary embodiment of the present invention.

Next, upon inputting the user ID, the fourth hash value, and the fifth hash value from the server communicator 21 as shown in FIG. 11 (Yes of step 63), the authentication information manager 22 outputs the highest-intensity hash algorithm identifier (sHash_alg_id), and the random number (rand1) and the third hash value (uid_passwd_uHashV) in the user information acquired in the step 56, respectively, as input information for creating the hash value to the hash value creator 26, and inputs the fourth hash value (uid_passwd_uHashV_rand1_sHashV) from the hash value creator 26 (step 64).

At this time, upon inputting the highest-intensity hash algorithm identifier (sHash_alg_id) as information of a request for creating the hash value, and the random number (rand1) and the third hash value (uid_passwd_uHashV) in the user information, respectively, as input information for creating the hash value from the authentication information manager 22 as shown in FIG. 15 (Yes of step 100), the hash value creator 26 creates the fourth hash value (uid_passwd_uHashV_rand1_sHashV) with the hash algorithm, which corresponds to this input identifier, by employing the random number (rand1) and the third hash value (uid_passwd_uHashV), and outputs the created fourth hash value to the authentication information manager 22 (step 101).

Next, the authentication information manager 22 compares the second hash value (uid_passwd_uHashV_rand1_sHashV) input from the server communicator 21 with the fourth hash value (uid_passwd_ uHashV_rand1_sHashV) input from the hash value creator 26, and determines whether or not it coincides (step 65).

And, in a case where each of these hash values does not coincide with the other (No of step 65), the authentication information manager 22 outputs the effect that the authentication is unsuccessful to the server communicator 21 as an authentication result (step 61 of FIG. 10).

On the other hand, in a case where each of these hash values coincides with the other (Yes of step 65), the authentication information manager 22 updates the user ID correspondence hash algorithm identifier (uHash_alg_id) in the user information that corresponds to the user ID (uid) into the highest-intensity hash algorithm identifier (sHash_alg_id) for the user information management table 24 (step 66).

Further, the authentication information manager 22 updates the third hash value (uid_passwd_uHashV) in the same user information into the fifth hash value (uid_Npasswd_sHashV) (step 66).

And, the authentication information manager 22 outputs the effect that the authentication is successful to the server communicator 21 as an authentication result (step 60 of FIG. 10).

The server communicator 21 transmits the authentication result input from the authentication information manager 22 to the client communicator 13 (Yes of step 40, and step 41 of FIG. 9), and the client communicator 13, upon receipt of the authentication result from the server communicator 21 (No of step 30, and Yes of step 32 of FIG. 8), outputs it to the authentication request manager 12 (step 33).

And, upon inputting the authentication result from the client communicator 13 (Yes of step 20 of FIG. 6), the authentication request manager 12 notifies this authentication result to the user by outputting it to the displaying device, or the like (step 21).

As explained above, in a case of changing the hash algorithm in use to the hash algorithm having a higher intensity, the authenticating system of this exemplary embodiment makes it possible to reflect the changing of the hash algorithm into the authenticating system by changing the hash algorithms in the authentication server apparatus side in the first place, and gradually changing the hash algorithms in the authentication client apparatus side authentication client apparatus by authentication client apparatus without changing the corresponding hash algorithms of all authentication client apparatuses at a stroke.

Further, even in a case of having changed the hash algorithm, it is possible to perform the authenticating process at a timing at which the user authentication is executed, and to update the existing user information by individually employing new hash algorithm, whereby the authenticating system does not need to be stopped for a purpose of newly preparing the user information in a lump at the time of changing the hash algorithm, and its authentication system can be successively utilized.

Needless to say, the present invention is not limited to the exemplary embodiments mentioned above, and various modifications hereto may be made within the scope of the present invention.

For example, in FIG. 1, only one authentication client apparatus 10 is shown; however a configuration can be made so that two authentication client apparatuses 10 or more are connected to one authentication server 20. Further, the hash algorithm also can be appropriately changed in such a manner that a new algorithm other than the algorithm shown in FIG. 2 is added.

When the necessity for changing the hash algorithm that is used in the system to the hash algorithm having a higher intensity arises, or the like due to the detection of fragility of the hash algorithm, and so on, the above-mentioned present invention makes it possible to change the hash algorithms in the authentication server apparatus side in the first place, and to gradually change the hash algorithms in the authentication client apparatus side server authentication client apparatus by authentication client apparatus without changing the corresponding hash algorithms of all authentication client apparatuses at a stroke.

Further, the above-mentioned present invention does not necessitate newly preparing the user information including the hash value at a stroke at a timing at which the hash algorithm is changed, and enables the user information to be individually updated at a timing at which the authentication of each user is executed.

The present invention can be preferredly utilized for the authenticating system etc. having a high possibility of comparatively frequently changing the hash algorithm, which is employed in the authenticating process, for a purpose of ensuring a security of communication between the client apparatus and the server apparatus.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. An authenticating system for, with a client apparatus and a server apparatus connected via a communication line, executing an authentication of a user of said client apparatus by employing a hash algorithm, wherein:

said client apparatus comprises:
  an authenticating information inputter for inputting authentication information including identification information and a password of the user;
  a client-side hash value creator for creating a first hash value from said authentication information by employing a first hash algorithm that corresponds to a first hash algorithm identifier transmitted from said server apparatus, and creating a second hash value from said first hash value and a random number transmitted from said server apparatus by employing said first hash algorithm; and
  an authentication request manager for transmitting authentication request information for causing said server apparatus to start an authenticating process to said server apparatus, receiving said random number and said first hash algorithm identifier from said server apparatus, transmitting said identification information of the user input from said authentication information inputter and said second hash value to said server apparatus, and receiving an authentication result from said server apparatus; and said server apparatus comprises:
  a user information storage in which user information has been stored that includes a second hash algorithm identifier that respectively corresponds for each said identification information of the user, and a third hash value pre-created from the authentication information including said identification information and said password of the user by employing a second hash algorithm that corresponds to this hash algorithm identifier;
  a random number creator for creating a random number;
  a server-side hash value creator for creating a hash value; and
  an authentication information manager for, upon receipt of said authentication request information from said client apparatus, causing said random number creator to create a random number, and transmitting said random number and said first hash algorithm identifier to said client apparatus, and for, upon receipt of said identification information of the user and said second hash value from said client apparatus, acquiring user information, which corresponds to this received identification information of the user, from said user information storage, determining whether or not said second hash algorithm identifier, which is included in said acquired user information, coincides with said first hash algorithm identifier, causing said server-side hash value creator to create a fourth hash value from a third hash value, which is included in said acquired user information, and said random number by employing said first hash algorithm in a case where it coincides, determining whether or not said second hash value coincides with said fourth hash value, transmitting the authentication result indicating that the authentication is successful to said client apparatus in a case where it coincides, and transmitting the authentication result indicating that the authentication is unsuccessful to said client apparatus in a case where it does not coincide; and the authentication system allows a change of a hash algorithm in the server apparatus, and then a gradual change of corresponding hash algorithms in a plurality of client apparatuses one by one, without changing corresponding hash algorithms of all client apparatuses at once, wherein:
said authentication information manager in said server apparatus transmits said second hash algorithm identifier to said client apparatus as hash algorithm change request information in a case of having determined that said second hash algorithm identifier does not coincides with said first hash algorithm identifier;
said authentication request manager in said client apparatus, upon receipt of said second hash algorithm identifier, causes said authentication information inputter to re-input said identification information, a password, and a new password of the user, causes said client-side hash value creator to create a new third hash value from said identification information and said password of the user, which were re-input, by employing said second hash algorithm, to create a new fourth hash value from said new third hash value and said random number by employing said first hash algorithm, and further to create a fifth hash value from said identification information and said new password of the user, which were re-input, by employing said first hash algorithm, and transmits said identification information of the user, said new fourth hash value, and said fifth hash value to said server apparatus; and
said authentication information manager in said server apparatus, upon receipt of said identification information of the user, said new fourth hash value, and said fifth hash value, causes said server-side hash value creator to create a fourth hash value from the third hash value, which is included in said acquired user information, and said random number by employing said first hash algorithm, determines whether or not said fourth hash value coincides with said new fourth hash value, updates said second hash algorithm identifier and said third hash value that correspond to said identification information of the user in said user information storage into said first hash algorithm identifier and said fifth hash value, respectively, to transmit the authentication result indicating that the authentication is successful to said client apparatus in a case where it coincides, and transmits the authentication result indicating that the authentication is unsuccessful to said client apparatus in a case where it does not coincide.

2. The authenticating system according to claim 1, wherein:
said client apparatus comprises a hash algorithm identifier storage in which a list of hash algorithm identifiers has been stored that are usable in the above client apparatus;
said server apparatus comprises a hash algorithm intensity storage in which an intensity of the hash algorithm has been stored that corresponds for each identifier of the hash algorithm;
said authentication request manager in said client apparatus, at the time of transmitting said authentication request information to said server apparatus, transmits said list of the hash algorithm identifiers to said server apparatus; and
said authentication information manager in said server apparatus, upon receipt of said authentication request information and said list of the hash algorithm identifiers from said client apparatus, selects an identifier of the hash algorithm having a highest intensity from among said list of the hash algorithm identifiers based upon the intensity of each hash algorithm stored in said hash algorithm intensity storage, and transmits this selected identifier as said first hash algorithm identifier together with said random number to said client apparatus.

3. An authenticating method of, with a client apparatus and a server apparatus connected via a communication line, executing an authentication of a user of said client apparatus by employing a hash algorithm, wherein:
an authentication request manager in said client apparatus transmits authentication request information for causing said server apparatus to start an authenticating process to said server apparatus;
an authentication information manager in said server apparatus, upon receipt of said authentication request information from said client apparatus, causes a random number creator in said server apparatus to create a random number, and transmits said random number and a predetermined first hash algorithm identifier to said client apparatus;
said authentication request manager in said client apparatus receives said random number and said first hash algorithm identifier from said server apparatus;
an authentication information inputter in said client apparatus inputs authentication information including identification information and a password of the user;
a client-side hash value creator in said client apparatus creates a first hash value from said authentication information by employing a first hash algorithm that corresponds to said first hash algorithm identifier, and creates a second hash value from said first hash value and said random number by employing said first hash algorithm;
said authentication request manager in said client apparatus transmits said identification information of the user and said second hash value to said server apparatus;
said authentication information manager in said server apparatus, upon receipt of said identification information of the user and said second hash value from said client apparatus, acquires user information that corresponds to this received identification information of the user from a user information storage in which user information has been pre-stored that includes a second hash algorithm identifier that respectively corresponds for each said identification information of the user, and a third hash value pre-created from the authentication information including said identification information and said password of the user by employing a second hash algorithm that corresponds to this hash algorithm identifier, determines whether or not said second hash algorithm identifier, which is included in said acquired user information, coincides with said first hash algorithm identifier, causes a server-side hash value creator in said server apparatus to create a fourth hash value from a third hash value, which is included in said acquired user information, and said random number by employing said first hash algorithm in a case where it coincides, determines whether or not said second hash value coincides with said fourth hash value, transmits the authentication result indicating that the authentication is successful to said client apparatus in a case where it coincides, and transmits the authentication result indicating that the authentication is unsuccessful to said client apparatus in a case where it does not coincide; and
said authentication request manager in said client apparatus receives the authentication result from said server apparatus; and
wherein:
the method allows a change of a hash algorithm in the server apparatus, and then a gradual change of corresponding hash algorithms in a plurality of client apparatuses one by one, without changing corresponding hash algorithms of all client apparatuses at once, said authentication information manager in said server apparatus transmits said second hash algorithm identifier to said client apparatus as hash algorithm change request information in a case of having determined that said second hash algorithm identifier does not coincide with said first hash algorithm identifier;

said authentication request manager in said client apparatus, upon receipt of said second hash algorithm identifier, causes said authentication information inputter in said client apparatus to re-input said identification information, a password, and a new password of the user, causes said client-side hash value creator in said client apparatus to create a new third hash value from said identification information and said password of the user, which were re-input, by employing said second hash algorithm, to create a new fourth hash value from said new third hash value and said random number by employing said first hash algorithm, and further to create a fifth hash value from said identification information and said new password of the user, which were re-input, by employing said first hash algorithm, and transmits said identification information of the user, said new fourth hash value, and said fifth hash value to said server apparatus; and said authentication information manager in said server apparatus, upon receipt of said identification information of the user, said new fourth hash value, and said fifth hash value, causes said server-side hash value creator in said server apparatus to create a fourth hash value from the third hash value, which is included in said acquired user information, and said random number by employing said first hash algorithm, determines whether or not said fourth hash value coincides with said new fourth hash value, updates said second hash algorithm identifier and said third hash value that correspond to said identification information of the user in said user information storage into said first hash algorithm identifier and said fifth hash value, respectively, to transmit the authentication result indicating that the authentication is successful to said client apparatus in a case where it coincides, and transmits the authentication result indicating that the authentication is unsuccessful to said client apparatus in a case where it does not coincide.

4. The authenticating method according to claim 3, wherein:

said client apparatus comprises a hash algorithm identifier storage in which a list of hash algorithm identifiers has been stored that are usable in the above client apparatus;

said server apparatus comprises a hash algorithm intensity storage in which an intensity of the hash algorithm has been stored that corresponds for each identifier of the hash algorithm;

said authentication request manager in said client apparatus, at the time of transmitting said authentication request information to said server apparatus, transmits said list of the hash algorithm identifiers to said server apparatus; and said authentication information manager in said server apparatus, upon receipt of said authentication request information and said list of the hash algorithm identifiers from said client apparatus, selects an identifier of the hash algorithm having a highest intensity from among said list of the hash algorithm identifiers based upon the intensity of each algorithm stored in said hash algorithm intensity storage, and transmits this selected identifier as said first hash algorithm identifier together with said random number to said client apparatus.

5. An authenticating program stored on a non-transitory medium for causing a client apparatus and a server apparatus connected via a communication line to execute an authentication of a user of said client apparatus by employing a hash algorithm, wherein execution of the medium causes:

said client apparatus to function as:

an authentication information inputter for inputting authentication information including identification information and a password of the user;

a client-side hash value creator for creating a first hash value from said authentication information by employing a first hash algorithm that corresponds to a first hash algorithm identifier transmitted from said server apparatus, and creating a second hash value from said first hash value and a random number transmitted from said server apparatus by employing said first hash algorithm; and an authentication request manager for transmitting authentication request information for causing said server apparatus to start an authenticating process to said server apparatus, receiving said random number and said first hash algorithm identifier from said server apparatus, transmitting said identification information of the user input from said authentication information inputter and said second hash algorithm to said server apparatus, and receiving an authentication result from said server apparatus; and said server apparatus to function as:

a random number creator for creating a random number;

a server-side hash value creator for creating a hash value; and an authentication information manager for, upon receipt of said authentication request information from said client apparatus, causing said random number creator to create a random number, and transmitting said random number and a predetermined first hash algorithm identifier to said client apparatus, and for, upon receipt of said identification information of the user and said second hash value from said client apparatus, acquiring said user information, which corresponds to this received identification information of the user, from a user information storage in which user information has been stored that includes a second hash algorithm identifier that respectively corresponds for each said identification information of the user, and a third hash value pre-created from the authentication information including said identification information and said password of the user by employing the second hash algorithm that corresponds to this hash algorithm identifier, determining whether or not said second hash algorithm identifier, which is included in said acquired user information, coincides with said first hash algorithm identifier, causing said server-side hash value creator to create a fourth hash value from a third hash value, which is included in said acquired user information, and said random number by employing said first hash algorithm in a case where it coincides, determining whether or not said second hash value coincides with said fourth hash value, transmitting the authentication result indicating that the authentication is successful to said client apparatus in a case where it coincides, and transmitting the authentication result indicating that the authentication is unsuccessful to said client apparatus in a case where it does not coincide; and wherein execution of the medium allows a change of a hash algorithm in the server apparatus, and then a gradual change of corresponding hash algorithms in a plurality of client apparatuses one by one, without changing corresponding hash algorithms of all client apparatuses at once; and wherein execution of the medium causes:

said authentication information manager in said server apparatus to transmit said second hash algorithm identifier to said client apparatus as hash algorithm change request information in a case of having determined that said second hash algorithm identifier does not coincides with said first hash algorithm identifier;

said authentication information inputter in said client apparatus to re-input said identification information, a password, and a new password of the user when said second hash algorithm identifier is received by said authentication request manager in said client apparatus;

said client-side hash value creator in said client apparatus to create a new third hash value from said identification information and said password of the user, which were re-input, by employing said second hash algorithm, to create a new fourth hash value from said new third hash value and said random number by employing said first hash algorithm, and further to create a fifth hash value from said identification information and said new password of the user, which were re-input, by employing said first hash algorithm;

said authentication request manager in said client apparatus to transmit said identification information of the user, said new fourth hash value, and said fifth hash value to said server apparatus;

said server-side hash value creator in said server apparatus to create a fourth hash value from the third hash value, which is included in said acquired user information, and said random number by employing said first hash algorithm when said identification information of the user, said new fourth hash value, and said fifth hash value are received by said authentication information manager in said server apparatus; and said authentication information manager in said server apparatus to determine whether or not said fourth hash value coincides with said new fourth hash value, to respectively update said second hash algorithm identifier and said third hash value that correspond to said identification information of the user in said user information storage into said first hash algorithm identifier and said fifth hash value and to transmit the authentication result indicating that the authentication is successful to said client apparatus in a case where it coincides, and to transmit the authentication result indicating that the authentication is unsuccessful to said client apparatus in a case where it does not coincide.

6. The authenticating program according to claim 5, wherein execution of the medium causes:

said client apparatus to function as a hash algorithm identifier storage in which a list of hash algorithm identifiers has been stored that are usable in the above client apparatus;

said server apparatus to function as a hash algorithm intensity storage in which an intensity of the hash algorithm has been stored that corresponds for each identifier of the hash algorithm;

said authentication request manager in said client apparatus to transmit said list of the hash algorithm identifiers to said server apparatus at the time of transmitting said authentication request information to said server apparatus,; and said authentication information manager in said server apparatus to select an identifier of the hash algorithm having a highest intensity from among said list of the hash algorithm identifiers based upon the intensity of each hash algorithm stored in said hash algorithm intensity storage when said authentication request information and said list of the hash algorithm identifiers are received from said client apparatus, and to transmit this selected identifier as said first hash algorithm identifier together with said random number to said client apparatus.

* * * * *